US012634213B2

(12) United States Patent
Sielinski et al.

(10) Patent No.: US 12,634,213 B2
(45) Date of Patent: May 19, 2026

(54) SYSTEM AND METHOD FOR TWO-TIER REPORTING FOR CLOUD COMPUTING REALMS

(71) Applicant: ORACLE INTERNATIONAL CORPORATION, Redwood Shores, CA (US)

(72) Inventors: Ronald Sielinski, Seattle, WA (US); Hong Wu, Bellevue, WA (US); Imran Ali, Austin, TX (US); Jie Xing, Redmond, WA (US); Sowjanya Yaddanapudi, Seattle, WA (US); Todd Himple, Seattle, WA (US); Muhammad Suhail, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/639,799

(22) Filed: Apr. 18, 2024

(65) Prior Publication Data

US 2024/0364606 A1    Oct. 31, 2024

Related U.S. Application Data

(60) Provisional application No. 63/462,882, filed on Apr. 28, 2023.

(51) Int. Cl.
*G06F 15/173* (2006.01)
*H04L 43/028* (2022.01)
*H04L 43/065* (2022.01)

(52) U.S. Cl.
CPC .......... *H04L 43/065* (2013.01); *H04L 43/028* (2013.01)

(58) Field of Classification Search
CPC ........................... H04L 43/065; H04L 43/028
See application file for complete search history.

(56) References Cited

U.S. PATENT DOCUMENTS

| | | | |
|---|---|---|---|
| 8,113,959 | B2 | 2/2012 | De Judicibus |
| 8,161,173 | B1 | 4/2012 | Mishra et al. |

(Continued)

FOREIGN PATENT DOCUMENTS

| | | |
|---|---|---|
| CA | 2804864 C | 11/2018 |
| CA | 3159014 A1 | 6/2021 |

(Continued)

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.

(Continued)

*Primary Examiner* — Duyen M Doan
(74) *Attorney, Agent, or Firm* — Invoke

(57) ABSTRACT

In accordance with an embodiment, systems and methods are provided for two-tier reporting for cloud computing realms. An exemplary method can deploy a central instance of an analytics service in a central cloud realm. The method can further deploy a respective instance of the analytics service in each of a plurality of cloud realms. The method can implement a respective different data pipeline for each deployed respective instance of the analytics service, wherein a respective different data pipeline is configured to perform at least one of ingest or transform data for the deployed respective instance of the analytics service, said data being descriptive of use of services associated with a respective cloud realm of the plurality of cloud realms.

21 Claims, 16 Drawing Sheets

(56) References Cited

U.S. PATENT DOCUMENTS

| | | |
|---|---|---|
| 8,214,398 B1 | 7/2012 | Cowan et al. |
| 8,898,763 B1 | 11/2014 | Mannepalli et al. |
| 9,092,502 B1 | 7/2015 | Cannaliato et al. |
| 9,100,424 B1 | 8/2015 | Thomas |
| 9,137,093 B1 | 9/2015 | Abraham et al. |
| 9,306,814 B1 | 4/2016 | Roth et al. |
| 9,438,599 B1 | 9/2016 | Yuhan et al. |
| 9,553,787 B1 | 1/2017 | Stickle et al. |
| 9,569,630 B2 | 2/2017 | Cabrera et al. |
| 9,571,516 B1 | 2/2017 | Curcic et al. |
| 9,722,895 B1 | 8/2017 | Sarukkai et al. |
| 9,824,390 B2 | 11/2017 | Adapalli et al. |
| 9,876,703 B1 | 1/2018 | Arllen et al. |
| 9,985,947 B1 | 5/2018 | Elhard |
| 10,021,084 B2 | 7/2018 | Matthews et al. |
| 10,061,932 B1 | 8/2018 | Combs et al. |
| 10,089,476 B1 | 10/2018 | Roth et al. |
| 10,122,717 B1 | 11/2018 | Reddy et al. |
| 10,237,149 B1 | 3/2019 | Guo et al. |
| 10,261,782 B2 | 4/2019 | Suarez et al. |
| 10,270,759 B1 | 4/2019 | Bordelon et al. |
| 10,318,265 B1 | 6/2019 | To et al. |
| 10,411,975 B2 | 9/2019 | Martinez et al. |
| 10,496,306 B1 | 12/2019 | Srivastava et al. |
| 10,503,917 B2 | 12/2019 | Roth et al. |
| 10,511,675 B1 | 12/2019 | Chud |
| 10,528,995 B2 | 1/2020 | Maes |
| 10,554,418 B2 | 2/2020 | Kshirsagar et al. |
| 10,567,360 B2 | 2/2020 | Nirwal et al. |
| 10,757,574 B1 | 8/2020 | Rule et al. |
| 10,834,100 B2 | 11/2020 | Hoy et al. |
| 10,878,483 B1 | 12/2020 | Felbinger et al. |
| 10,956,600 B2 | 3/2021 | Ye et al. |
| 10,972,445 B2 | 4/2021 | Tucker et al. |
| 10,974,516 B2 | 4/2021 | Moriya |
| 11,070,492 B2 | 7/2021 | Kostov et al. |
| 11,121,985 B2 | 9/2021 | Cidon et al. |
| 11,240,110 B1 | 2/2022 | Narula et al. |
| 11,252,157 B1 | 2/2022 | Khanna et al. |
| 11,321,137 B2 | 5/2022 | Barsalou et al. |
| 11,323,477 B1 | 5/2022 | Kumar et al. |
| 11,356,273 B1 | 6/2022 | Patel et al. |
| 11,360,821 B1 | 6/2022 | Dey et al. |
| 11,379,353 B1 | 7/2022 | Marchetti et al. |
| 11,436,012 B1* | 9/2022 | Narayan ............... G06F 9/5055 |
| 11,444,925 B1 | 9/2022 | Patimer et al. |
| 11,537,627 B1 | 12/2022 | Baskaran et al. |
| 11,537,745 B2 | 12/2022 | Yang et al. |
| 11,552,953 B1 | 1/2023 | Avadhanam |
| 11,574,151 B2 | 2/2023 | Wang et al. |
| 11,575,508 B2 | 2/2023 | Anand et al. |
| 11,587,458 B2 | 2/2023 | Lowensohn |
| 11,593,251 B2 | 2/2023 | Chirkin et al. |
| 11,604,672 B2 | 3/2023 | Subramanian et al. |
| 11,611,558 B2 | 3/2023 | Lee et al. |
| 11,652,616 B2 | 5/2023 | Zee et al. |
| 11,689,475 B2 | 6/2023 | Goyal |
| 11,720,536 B1 | 8/2023 | Kisser et al. |
| 11,727,464 B2 | 8/2023 | Eisenstein et al. |
| 11,765,244 B1 | 9/2023 | Barclay et al. |
| 11,853,753 B1 | 12/2023 | Chawda et al. |
| 11,936,678 B2 | 3/2024 | Pieczul et al. |
| 11,943,385 B1 | 3/2024 | Kumar et al. |
| 11,954,238 B1 | 4/2024 | Tan et al. |
| 12,021,888 B1 | 6/2024 | Reed et al. |
| 12,028,274 B1 | 7/2024 | Krishnaiah et al. |
| 12,067,493 B2 | 8/2024 | Zhang et al. |
| 12,143,917 B2 | 11/2024 | Raffa et al. |
| 12,164,652 B1 | 12/2024 | Li et al. |
| 12,363,148 B1 | 7/2025 | Anil et al. |
| 12,373,252 B1 | 7/2025 | Faust et al. |
| 12,412,103 B1 | 9/2025 | Chen et al. |
| 12,445,419 B2 | 10/2025 | Adogla et al. |
| 12,457,204 B2 | 10/2025 | Adogla et al. |
| 12,475,015 B2 | 11/2025 | Peterson et al. |
| 12,487,833 B2 | 12/2025 | Peterson et al. |
| 12,493,901 B2 | 12/2025 | Gallagher et al. |
| 2002/0026592 A1 | 2/2002 | Gavrila et al. |
| 2002/0198973 A1 | 12/2002 | Besaw |
| 2003/0135593 A1 | 7/2003 | Lee et al. |
| 2003/0154407 A1 | 8/2003 | Kato et al. |
| 2005/0198331 A1 | 9/2005 | Okajima et al. |
| 2006/0230281 A1 | 10/2006 | Hofmann |
| 2006/0259833 A1 | 11/2006 | Swoboda et al. |
| 2007/0124374 A1 | 5/2007 | Arun et al. |
| 2007/0168531 A1 | 7/2007 | Sitaraman et al. |
| 2007/0179859 A1 | 8/2007 | Chan et al. |
| 2009/0164499 A1 | 6/2009 | Samudrala et al. |
| 2009/0165078 A1 | 6/2009 | Samudrala et al. |
| 2009/0205018 A1 | 8/2009 | Ferraiolo et al. |
| 2010/0106678 A1 | 4/2010 | Pietrek et al. |
| 2010/0131624 A1 | 5/2010 | Ferris |
| 2010/0153865 A1 | 6/2010 | Barnes et al. |
| 2010/0212004 A1 | 8/2010 | Fu |
| 2011/0167435 A1 | 7/2011 | Fang |
| 2011/0277017 A1 | 11/2011 | Ivanov et al. |
| 2011/0295727 A1 | 12/2011 | Ferris et al. |
| 2011/0296000 A1 | 12/2011 | Ferris et al. |
| 2012/0117462 A1 | 5/2012 | Jacobson |
| 2012/0124211 A1 | 5/2012 | Kampas et al. |
| 2012/0131162 A1 | 5/2012 | Brandt et al. |
| 2012/0137001 A1 | 5/2012 | Ferris et al. |
| 2013/0054426 A1 | 2/2013 | Rowland et al. |
| 2013/0111027 A1 | 5/2013 | Milojicic et al. |
| 2013/0111609 A1 | 5/2013 | Resch et al. |
| 2013/0124720 A1 | 5/2013 | Wood et al. |
| 2013/0226699 A1 | 8/2013 | Long |
| 2013/0232463 A1 | 9/2013 | Nagaraja |
| 2013/0232480 A1 | 9/2013 | Winterfeldt |
| 2013/0276142 A1 | 10/2013 | Peddada |
| 2013/0282540 A1 | 10/2013 | Bliesner |
| 2013/0282798 A1 | 10/2013 | Mccarthy et al. |
| 2013/0297711 A1 | 11/2013 | Nhu |
| 2013/0304925 A1 | 11/2013 | Ferris et al. |
| 2013/0339515 A1 | 12/2013 | Radhakrishnan |
| 2014/0007041 A1 | 1/2014 | Schmeling et al. |
| 2014/0047064 A1* | 2/2014 | Maturana ................. G06N 7/01 |
| | | 709/217 |
| 2014/0074793 A1 | 3/2014 | Doering et al. |
| 2014/0075034 A1 | 3/2014 | Vasudevan et al. |
| 2014/0075565 A1 | 3/2014 | Srinivasan et al. |
| 2014/0089393 A1 | 3/2014 | Druet et al. |
| 2014/0095546 A1 | 4/2014 | Kruglikov et al. |
| 2014/0122707 A1 | 5/2014 | De et al. |
| 2014/0188938 A1 | 7/2014 | Banks et al. |
| 2014/0215590 A1 | 7/2014 | Brand |
| 2014/0236745 A1 | 8/2014 | Vautour |
| 2014/0280595 A1 | 9/2014 | Mani et al. |
| 2014/0280948 A1 | 9/2014 | Schmidt et al. |
| 2015/0089575 A1 | 3/2015 | Vepa et al. |
| 2015/0106736 A1 | 4/2015 | Torman et al. |
| 2015/0134485 A1 | 5/2015 | Kim et al. |
| 2015/0180734 A1 | 6/2015 | Maes et al. |
| 2015/0200966 A1 | 7/2015 | Kasturirangan et al. |
| 2015/0242262 A1 | 8/2015 | Ranganathan et al. |
| 2015/0312268 A1 | 10/2015 | Ray |
| 2015/0350101 A1* | 12/2015 | Sinha ..................... H04L 67/10 |
| | | 709/226 |
| 2015/0358161 A1 | 12/2015 | Kancharla et al. |
| 2015/0363852 A1 | 12/2015 | Vautour |
| 2015/0365291 A1 | 12/2015 | Burton et al. |
| 2015/0372938 A1 | 12/2015 | Patel et al. |
| 2015/0381526 A1 | 12/2015 | Beaty et al. |
| 2016/0028833 A1 | 1/2016 | Georgieva |
| 2016/0043909 A1 | 2/2016 | Pogrebinsky et al. |
| 2016/0110553 A1 | 4/2016 | Factor et al. |
| 2016/0125489 A1 | 5/2016 | Gupte et al. |
| 2016/0127418 A1 | 5/2016 | Maes et al. |
| 2016/0132806 A1 | 5/2016 | To et al. |
| 2016/0139737 A1 | 5/2016 | Conn et al. |
| 2016/0142211 A1 | 5/2016 | Metke et al. |
| 2016/0142323 A1 | 5/2016 | Lehmann et al. |
| 2016/0203544 A1 | 7/2016 | Smits et al. |
| 2016/0253722 A1 | 9/2016 | Johnson et al. |

(56) References Cited

U.S. PATENT DOCUMENTS

| | | |
|---|---|---|
| 2016/0277411 A1 | 9/2016 | Dani et al. |
| 2016/0294881 A1 | 10/2016 | Hua et al. |
| 2016/0323183 A1 | 11/2016 | Jeuk et al. |
| 2016/0337365 A1 | 11/2016 | Beiter |
| 2017/0006119 A1 | 1/2017 | Pogrebinsky et al. |
| 2017/0069011 A1 | 3/2017 | Akkiraju et al. |
| 2017/0111331 A1 | 4/2017 | Auradkar et al. |
| 2017/0111446 A1 | 4/2017 | Rivera et al. |
| 2017/0116334 A1 | 4/2017 | Kruglikov et al. |
| 2017/0149564 A1 | 5/2017 | Mccallum |
| 2017/0201525 A1 | 7/2017 | Biller et al. |
| 2017/0214632 A1 | 7/2017 | Ravi |
| 2017/0230229 A1 | 8/2017 | Sasturkar et al. |
| 2017/0272336 A1 | 9/2017 | Johnstone et al. |
| 2017/0323112 A1 | 11/2017 | Tran et al. |
| 2017/0373860 A1 | 12/2017 | Kshirsagar et al. |
| 2018/0025399 A1 | 1/2018 | Nedeltchev et al. |
| 2018/0025403 A1 | 1/2018 | Mckay et al. |
| 2018/0052861 A1 | 2/2018 | Seetharaman et al. |
| 2018/0124105 A1 | 5/2018 | Rodrigues |
| 2018/0137261 A1 | 5/2018 | Lattin et al. |
| 2018/0176023 A1 | 6/2018 | Prickett et al. |
| 2018/0191718 A1 | 7/2018 | Kuzkin et al. |
| 2018/0197161 A1 | 7/2018 | Kuzkin et al. |
| 2018/0211236 A1 | 7/2018 | Rutherford et al. |
| 2018/0212778 A1 | 7/2018 | Novak |
| 2018/0219784 A1 | 8/2018 | Jiang et al. |
| 2018/0232786 A1 | 8/2018 | Kuzkin et al. |
| 2018/0234256 A1 | 8/2018 | Bowen |
| 2018/0287914 A1 | 10/2018 | Gupta |
| 2018/0288063 A1 | 10/2018 | Koottayi et al. |
| 2018/0288135 A1 | 10/2018 | Narayan et al. |
| 2018/0356964 A1 | 12/2018 | Morris |
| 2018/0367542 A1 | 12/2018 | Wolf et al. |
| 2018/0373521 A1 | 12/2018 | Huang et al. |
| 2019/0020659 A1 | 1/2019 | Loni et al. |
| 2019/0068495 A1 | 2/2019 | Jeuk et al. |
| 2019/0068622 A1 | 2/2019 | Lin et al. |
| 2019/0075111 A1 | 3/2019 | Mutha et al. |
| 2019/0087835 A1 | 3/2019 | Schwed et al. |
| 2019/0104035 A1 | 4/2019 | Cidon et al. |
| 2019/0114335 A1 | 4/2019 | Koenig et al. |
| 2019/0132299 A1 | 5/2019 | Tucker et al. |
| 2019/0149417 A1 | 5/2019 | Augusto et al. |
| 2019/0156000 A1 | 5/2019 | Hoffmann et al. |
| 2019/0166007 A1 | 5/2019 | Sundaram et al. |
| 2019/0182153 A1 | 6/2019 | Gundavelli et al. |
| 2019/0190917 A1 | 6/2019 | Joe |
| 2019/0205045 A1 | 7/2019 | Hugot et al. |
| 2019/0273796 A1 | 9/2019 | Allgeier et al. |
| 2019/0332789 A1 | 10/2019 | Vandenbrouck et al. |
| 2019/0334917 A1 | 10/2019 | Demmler et al. |
| 2019/0354692 A1 | 11/2019 | Thoram et al. |
| 2019/0362087 A1 | 11/2019 | Ferrans et al. |
| 2020/0004569 A1 | 1/2020 | Gupta et al. |
| 2020/0014659 A1 | 1/2020 | Chasman et al. |
| 2020/0042675 A1 | 2/2020 | Asanghanwa et al. |
| 2020/0097315 A1 | 3/2020 | Faynberg et al. |
| 2020/0112497 A1 | 4/2020 | Yenumulapalli et al. |
| 2020/0117757 A1 | 4/2020 | Yanamandra et al. |
| 2020/0127823 A1 | 4/2020 | Vats et al. |
| 2020/0204357 A1 | 6/2020 | Seyfried et al. |
| 2020/0244527 A1 | 7/2020 | Sharma et al. |
| 2020/0244549 A1 | 7/2020 | Finch et al. |
| 2020/0250661 A1 | 8/2020 | Padmanabhan et al. |
| 2020/0274900 A1 | 8/2020 | Vaishnavi |
| 2020/0285737 A1 | 9/2020 | Kraus et al. |
| 2020/0358756 A1 | 11/2020 | Rose et al. |
| 2020/0366716 A1 | 11/2020 | Singh et al. |
| 2020/0389463 A1 | 12/2020 | Chen |
| 2021/0036851 A1 | 2/2021 | Villapakkam et al. |
| 2021/0064431 A1 | 3/2021 | Smith et al. |
| 2021/0067372 A1 | 3/2021 | Cidon et al. |
| 2021/0067468 A1 | 3/2021 | Cidon et al. |
| 2021/0075870 A1 | 3/2021 | Kempf et al. |
| 2021/0081404 A1 | 3/2021 | Kempf et al. |
| 2021/0084048 A1 | 3/2021 | Kannan et al. |
| 2021/0142276 A1 | 5/2021 | Gupte |
| 2021/0182940 A1 | 6/2021 | Gupta et al. |
| 2021/0216190 A1 | 7/2021 | Vakil et al. |
| 2021/0218722 A1 | 7/2021 | Gaylor et al. |
| 2021/0224076 A1 | 7/2021 | Dockter et al. |
| 2021/0224132 A1 | 7/2021 | Barsalou |
| 2021/0224409 A1 | 7/2021 | Avanes et al. |
| 2021/0226956 A1 | 7/2021 | Wei et al. |
| 2021/0234864 A1 | 7/2021 | Dube et al. |
| 2021/0273914 A1 | 9/2021 | Cobb |
| 2021/0279109 A1 | 9/2021 | Ji et al. |
| 2021/0334345 A1 | 10/2021 | Sim et al. |
| 2021/0368514 A1 | 11/2021 | Xing |
| 2021/0377272 A1 | 12/2021 | Dasari et al. |
| 2021/0377276 A1 | 12/2021 | Dasari et al. |
| 2021/0377735 A1 | 12/2021 | Latour et al. |
| 2021/0382725 A1 | 12/2021 | Vemula et al. |
| 2021/0383325 A1 | 12/2021 | Loupos et al. |
| 2021/0392048 A1 | 12/2021 | Olden et al. |
| 2021/0392142 A1 | 12/2021 | Stephens et al. |
| 2021/0409403 A1 | 12/2021 | Lewin et al. |
| 2022/0029803 A1 | 1/2022 | Vijayanarayanan |
| 2022/0038449 A1 | 2/2022 | Tripp et al. |
| 2022/0091947 A1 | 3/2022 | Kothari et al. |
| 2022/0103566 A1 | 3/2022 | Faulkner |
| 2022/0103618 A1 | 3/2022 | Pinheiro et al. |
| 2022/0116285 A1 | 4/2022 | Abdollahi et al. |
| 2022/0116286 A1 | 4/2022 | Doshi et al. |
| 2022/0122097 A1 | 4/2022 | Maugans, III |
| 2022/0129575 A1 | 4/2022 | Goel et al. |
| 2022/0150124 A1 | 5/2022 | Cooley et al. |
| 2022/0150133 A1 | 5/2022 | Dhruvakumar et al. |
| 2022/0159010 A1 | 5/2022 | Bandarupalli et al. |
| 2022/0191192 A1 | 6/2022 | Drr et al. |
| 2022/0210018 A1 | 6/2022 | Narula et al. |
| 2022/0244949 A1 | 8/2022 | Iqbal et al. |
| 2022/0255902 A1 | 8/2022 | Woodson |
| 2022/0258066 A1 | 8/2022 | Choi et al. |
| 2022/0263793 A1 | 8/2022 | Baker et al. |
| 2022/0263835 A1 | 8/2022 | Pieczul et al. |
| 2022/0271929 A1 | 8/2022 | Villapakkam et al. |
| 2022/0283926 A1 | 9/2022 | Chirkin et al. |
| 2022/0294818 A1 | 9/2022 | Parekh et al. |
| 2022/0300486 A1 | 9/2022 | Venkateshaiah et al. |
| 2022/0327095 A1 | 10/2022 | Kim et al. |
| 2022/0335340 A1 | 10/2022 | Moustafa et al. |
| 2022/0337578 A1 | 10/2022 | Mankekar et al. |
| 2022/0350675 A1 | 11/2022 | Navali et al. |
| 2022/0350923 A1 * | 11/2022 | Kremer ............... G06F 21/6254 |
| 2022/0353133 A1 | 11/2022 | Shrestha et al. |
| 2022/0353266 A1 | 11/2022 | Ramamurthi et al. |
| 2022/0353267 A1 | 11/2022 | Kundu et al. |
| 2022/0365835 A1 | 11/2022 | Kandasamy et al. |
| 2022/0368813 A1 | 11/2022 | Rossignol et al. |
| 2022/0374271 A1 | 11/2022 | Pogrebinsky et al. |
| 2022/0377111 A1 | 11/2022 | Liao et al. |
| 2022/0382590 A1 | 12/2022 | Hashimoto et al. |
| 2022/0398078 A1 | 12/2022 | Segler |
| 2022/0405152 A1 | 12/2022 | Edamadaka et al. |
| 2022/0413956 A1 | 12/2022 | Mathew et al. |
| 2023/0006889 A1 | 1/2023 | Thyagaturu et al. |
| 2023/0011628 A1 | 1/2023 | Hurley et al. |
| 2023/0068221 A1 | 3/2023 | Magowan et al. |
| 2023/0086475 A1 | 3/2023 | Mosko |
| 2023/0104368 A1 | 4/2023 | Miriyala et al. |
| 2023/0105901 A1 | 4/2023 | Adogla et al. |
| 2023/0107133 A1 | 4/2023 | Ali et al. |
| 2023/0108661 A1 | 4/2023 | Adogla et al. |
| 2023/0109926 A1 | 4/2023 | Nair et al. |
| 2023/0110527 A1 | 4/2023 | Bhat et al. |
| 2023/0116463 A1 | 4/2023 | Rath et al. |
| 2023/0123734 A1 | 4/2023 | Oxman et al. |
| 2023/0132478 A1 | 5/2023 | Robinson et al. |
| 2023/0179525 A1 * | 6/2023 | Pai ........................ H04L 43/10 |
| | | 709/223 |
| 2023/0195926 A1 | 6/2023 | Mehta et al. |
| 2023/0222550 A1 | 7/2023 | Huang et al. |

(56) References Cited

U.S. PATENT DOCUMENTS

| | | | |
|---|---|---|---|
| 2023/0224304 A1 | 7/2023 | Lukanov et al. | |
| 2023/0229543 A1 | 7/2023 | Mohanty et al. | |
| 2023/0244505 A1 | 8/2023 | Hernandez et al. | |
| 2023/0275833 A1 | 8/2023 | Hyun et al. | |
| 2023/0281100 A1* | 9/2023 | Wells | G06F 11/3006 |
| | | | 702/186 |
| 2023/0297962 A1 | 9/2023 | Alabdrabalnabi et al. | |
| 2023/0315726 A1 | 10/2023 | Ponjavic et al. | |
| 2023/0316348 A1 | 10/2023 | Dageville et al. | |
| 2023/0328003 A1 | 10/2023 | Agarwal et al. | |
| 2023/0342179 A1 | 10/2023 | Suttle et al. | |
| 2023/0362161 A1 | 11/2023 | Spector et al. | |
| 2023/0367654 A1 | 11/2023 | Kurian et al. | |
| 2023/0370461 A1 | 11/2023 | Kalley et al. | |
| 2023/0385286 A1 | 11/2023 | Glickman et al. | |
| 2023/0393829 A1 | 12/2023 | Panikkar et al. | |
| 2023/0409590 A1 | 12/2023 | Shah et al. | |
| 2024/0015164 A1 | 1/2024 | Guy et al. | |
| 2024/0015165 A1 | 1/2024 | Guy et al. | |
| 2024/0031373 A1 | 1/2024 | Gupta | |
| 2024/0053973 A1 | 2/2024 | Ranganathan et al. | |
| 2024/0054063 A1 | 2/2024 | Wichelman et al. | |
| 2024/0061714 A1 | 2/2024 | Pandit et al. | |
| 2024/0069884 A1 | 2/2024 | Majumdar et al. | |
| 2024/0070735 A1 | 2/2024 | Gallagher et al. | |
| 2024/0089722 A1 | 3/2024 | Samanta et al. | |
| 2024/0095056 A1 | 3/2024 | Adogla et al. | |
| 2024/0095390 A1 | 3/2024 | Chao et al. | |
| 2024/0095739 A1 | 3/2024 | Adogla et al. | |
| 2024/0095809 A1 | 3/2024 | Adogla et al. | |
| 2024/0095865 A1 | 3/2024 | Adogla et al. | |
| 2024/0098088 A1 | 3/2024 | Adogla et al. | |
| 2024/0098089 A1 | 3/2024 | Adogla et al. | |
| 2024/0103818 A1 | 3/2024 | Gallagher et al. | |
| 2024/0106832 A1 | 3/2024 | Adogla et al. | |
| 2024/0137339 A1 | 4/2024 | Vemulpali | |
| 2024/0143351 A1 | 5/2024 | Davis | |
| 2024/0152401 A1 | 5/2024 | Naseem | |
| 2024/0154992 A1 | 5/2024 | Martin et al. | |
| 2024/0171586 A1 | 5/2024 | Jain et al. | |
| 2024/0179146 A1 | 5/2024 | Pinski et al. | |
| 2024/0184465 A1 | 6/2024 | Zwiegincew et al. | |
| 2024/0205235 A1 | 6/2024 | Batni | |
| 2024/0232408 A1 | 7/2024 | Pan et al. | |
| 2024/0235945 A1 | 7/2024 | Togare | |
| 2024/0244053 A1 | 7/2024 | Tian et al. | |
| 2024/0259389 A1 | 8/2024 | Wu et al. | |
| 2024/0275853 A1 | 8/2024 | Singh et al. | |
| 2024/0291729 A1 | 8/2024 | Khan et al. | |
| 2024/0305622 A1 | 9/2024 | Vijayan et al. | |
| 2024/0320240 A1 | 9/2024 | Podder | |
| 2024/0330069 A1 | 10/2024 | Atur et al. | |
| 2024/0330072 A1 | 10/2024 | Kantamneni et al. | |
| 2024/0362142 A1 | 10/2024 | Berg et al. | |
| 2024/0364509 A1 | 10/2024 | Potlapally et al. | |
| 2024/0364638 A1 | 10/2024 | Peterson et al. | |
| 2024/0364690 A1 | 10/2024 | Doherty et al. | |
| 2024/0378307 A1 | 11/2024 | Dcosta | |
| 2024/0378518 A1 | 11/2024 | Sparrow et al. | |
| 2024/0388512 A1 | 11/2024 | Tesfatsion et al. | |
| 2024/0414169 A1 | 12/2024 | Fang et al. | |
| 2024/0414518 A1 | 12/2024 | Joseph et al. | |
| 2025/0023844 A1 | 1/2025 | Juneja et al. | |
| 2025/0077214 A1 | 3/2025 | Banaal | |
| 2025/0085978 A1 | 3/2025 | R C et al. | |
| 2025/0097215 A1 | 3/2025 | Vangpat et al. | |
| 2025/0097223 A1 | 3/2025 | Brown et al. | |
| 2025/0106221 A1 | 3/2025 | Wang et al. | |
| 2025/0322077 A1 | 10/2025 | Panwar et al. | |
| 2025/0379830 A1 | 12/2025 | Deowanshi et al. | |

FOREIGN PATENT DOCUMENTS

| | | | |
|---|---|---|---|
| CN | 102656589 A | 9/2012 | |
| CN | 104106276 A | 10/2014 | |
| CN | 108197493 A | 6/2018 | |
| CN | 114091725 A | 2/2022 | |
| CN | 118312629 A | 7/2024 | |
| EP | 2893685 B1 | 7/2017 | |
| EP | 3429156 A1 | 1/2019 | |
| EP | 3271857 B1 | 4/2020 | |
| WO | 2010/088081 A1 | 8/2010 | |
| WO | 2012/006638 A1 | 1/2012 | |
| WO | 2014/039921 A1 | 3/2014 | |
| WO | 2018/010791 A1 | 1/2018 | |
| WO | 2019/212773 A1 | 11/2019 | |
| WO | 2020/252088 A1 | 12/2020 | |
| WO | 2021/051933 A1 | 3/2021 | |
| WO | 2021/145894 A1 | 7/2021 | |
| WO | 2021/150306 A1 | 7/2021 | |
| WO | 2021/150307 A1 | 7/2021 | |
| WO | 2021/150366 A1 | 7/2021 | |
| WO | 2021/150435 A1 | 7/2021 | |
| WO | 2021/174104 A1 | 9/2021 | |
| WO | 2022/005992 A1 | 1/2022 | |
| WO | 2022/104395 A1 | 5/2022 | |
| WO | 2022/104396 A1 | 5/2022 | |

OTHER PUBLICATIONS

"General Variables for All Requests", Jun. 28, 2023, pp. 6.
"Overview of Access Approval", Retrieved from https://cloud.google.com/assured-workloads/access-approval/docs/overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymous: "Tokenization—(data security)", Wikipedia, Feb. 12, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.
Anonymous: "Oracle Cloud Infrastructure Documentation—Security Guide for Exadata Database Service on Cloud@Customer Systems", Apr. 1, 2023, XP093181902.
Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.

(56) References Cited

OTHER PUBLICATIONS

Anonymous: "Oracle Cloud Infrastructure Documentation—Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

Anonymous: "Oracle Cloud Infrastructure Documentation—Getting Started with Policies", Jan. 4, 2023, XP093184099.

Anonymous: "Oracle Cloud Infrastructure Documentation—Getting Summary Information on the Overview Page", Aug. 16, 2022, XP093183031.

Anonymous: "Oracle Cloud Infrastructure Documentation—Learn Best Practices for Set ting Up Your Tenancy", Feb. 8, 2023, XP093184095.

Anonymous: "Oracle Cloud Infrastructure Documentation—Managing Compartments", Feb. 8, 2023, XP093184098.

Anonymous: "Oracle Cloud Infrastructure Documentation—Monitoring Threats", Sep. 28, 2022, XP093183035.

Anonymous: "Oracle Cloud Infrastructure Documentation—Overview of the Console Dashboards Service", Mar. 14, 2023, XP093184740.

Anonymous: "Oracle Cloud Infrastructure Documentation—Prerequisites for Oracle Platform Services on Oracle Cloud Infrastructure", Mar. 23, 2023, XP093185058.

Anonymous: "Oracle Cloud Infrastructure Documentation—Welcome to Oracle Cloud Infrastructure", Mar. 23, 2023, XP093182493.

Anonymous: "Oracle Gen 2 Exadata Cloud@Customer Security Controls", Jan. 11, 2023, XP093181973.

Anonymous: "Oracle Operator Access Control Configuration and Administration Guide", Nov. 18, 2022, XP093181896.

Anonymous: "Oracle Public Sector Licensing and Permitting", 2022, XP093184298.

Anonymous: "Oracle Sovereign Cloud", Feb. 15, 2023, XP093184649.

Apps2fusion: "Security Roles in Oracle Fusion Cloud SLA", Nov. 30, 2018, XP093184293.

Magouryrk Clay: "Announcing Oracle Alloy: The power of the cloud in your hands", Oct. 18, 2022, XP093183485.

Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

"Cloud External Key Manager," Retrieved from https://cloud.google.com/kms/docs/ekm, Mar. 4, 2024, pp. 5.

"CNAME Record", Wikipedia, Available Online at: https://en.wikipedia.org/w/index.php?title=CNAME_record&oldId=1105641340, Accessed from Internet on Jan. 24, 2024, 4 pages.

"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.

"Developing System Services in Oracle Solaris 11.3", Oracle, Available Online at: https://docs.oracle.com/cd/E53394_01/pdf/E60814.pdf, Sep. 1, 2018, 76 pages.

"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-08-2023.pdf, Retrieved on Jul. 30, 2024, pp. 2.

"External key stores," Retrieved from https://docs.aws.amazon.com/kms/latest/developerguide/keystore-external.html, Mar. 4, 2024, pp. 16.

"Generating and using SSH keys for remote host authentication," Retrieved from https://cloud.ibm.com/docs/ssh-keys?topic=ssh-keys-generating-and-using-ssh-keys-for-remote-host-authentication, Apr. 27, 2023, pp. 5.

"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/ zIntegrating_MVISION_Cloud_On-Prem_Proxy_with_a_Key_Management_Server, Sep. 3, 2021, pp. 3.

"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.

"Multicloud Architecture Partitioned, Cloud Burst and DR", NetApp, Apr. 9, 2020, 7 pages.

"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, pp. 12.

"Sepior's Cloud Encryption Technology Now Supports Key Management Interoperability Protocol (KMIP)," Sepior, Nov. 10, 2017, pp. 4.

"SSH Certificates Management Automation Made Easy Introducing Certonid," Retrieved from https://mailtrap.io/blog/certonid/, Retrieved on Aug. 5, 2024, pp. 19.

"StorMagic-SvKMS-Data-Sheet," Retrieved from https://stormagic.com/pdf/data-sheet/StorMagic-SvKMS-Data-Sheet.pdf, 2023, pp. 4.

10 Reasons to Become an AwesomeCloud Channel Partner, Available online at: https://www.awesomecloud.com/about/why-awesomecloud/, 2023, 3 pages.

Aldossary, "A Review of Dynamic Resource Management in Cloud Computing Environments", Computer Systems Science and Engineering, vol. 36, No. 3, 2021, pp. 461-476.

Anonymous: "AWS Identity and Access Management user guide—first 400 pages", Mar. 15, 2024, https://web.archive.org/web/2024031518 3106if_/https://docs.aws.amazon.com/pdfs/IAM/latest/UserGuide/iam-ug.pdf, pp. 4215.

Anonymous: "IAM Roles Anywhere with an external certificate authority : AWS Security Blog", Oct. 20, 2023, Retrieved from https://aws.amazon.com/blogs/security/ iam-roles-anywhere-with-an-external-certificate-authority/, pp. 1-18.

Anonymous: "OCI Documentation—Managing Key Pairs on Linux Instances", Mar. 6, 2024, https://web.archive.org/web/2024030621 4752/https://docs.oracle.com/en-us/iaas/Content/Compute/Tasks/managingkeypairs.htm.

Anonymous: "OCI Documentation—Security Credentials", Dec. 11, 2023, https://web.archive.org/web/2023121122 2908/https://docs.oracle.com/en-us/iaas/Content/General/Concepts/credentials.htm.

Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-jam-roles-anywhere/, Nov. 8, 2023, pp. 1-14.

U.S. Appl. No. 18/368,884, Final Office Action, Mailed On Nov. 10, 2025, 58 pages.

U.S. Appl. No. 18/468,024, Notice of Allowance, Mailed On Jun. 23, 2025, 8 pages.

U.S. Appl. No. 18/468,238 , Notice of Allowance, Mailed On Jul. 3, 2025, 9 pages.

AwesomeCloud Services, Available online at: https://www.awesomecloud.com/about/, Accessed from internet on Jan. 18, 2023, 2 pages.

Azure Marketplace Service Providers Guide, Available online at: https://docs.azure.cn/en-us/articles/azure-marketplace/publishguide, Mar. 9, 2021, 9 pages.

Bridgwater, "Location, Location, Partition How To Beat Latency As Cloud Grows", Forbes, Dec. 3, 2020, 5 pages.

Cloud Reseller Program Overview, Available online at: https://www.awesomecloud.com/cloud-reseller-program/, 2023, 3 pages.

Create a Private Marketplace, Available online at: https://cloud.google.com/marketplace/docs/governance/private-marketplace, Accessed from internet on Jan. 18, 2023, 2 pages.

Direct As-a-Service Sales Platform, Available online at: https://www.appxite.com/cloud-saas-sellers, 2022, 3 pages.

Drive Revenue by Selling in AWS Marketplace, Available online at: https://aws.amazon.com/marketplace/partners/management-tour, Accessed from internet on Jan. 18, 2023, 7 pages.

(56)        References Cited

OTHER PUBLICATIONS

Enable Google Private Marketplace, Available online at: https://cloud.google.com/marketplace/docs/governance/enable-private-marketplace, Accessed from internet on Jan. 18, 2023, 2 pages.
Ferry, "Kubernetes Namespaces Isolation—What It is, What It Isn't, Life, Universe and Everything", SynActiv, 2021, 13 pages.
Gholipour et al., "Recent Advances in Energy-Efficient Resource Management Techniques in Cloud Computing Environments", New Frontiers in Cloud Computing and Internet of Things, 2021, pp. 31-68.
Girola et al., "IBM Data Center Networking; Planning for Virtualization and Cloud Computing", Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., "Oracle Database Security Guide", Nov. 2023, https://web.archive.org/web/20231121145008if_/https://docs.oracle.com/en/database/oracle/oracle-database/23/dbseg/database-security-guide.pdf, pp. 1327.
International Application No. PCT/US2023/074323, International Search Report and the Written Opinion, mailed on Nov. 22, 2023, 15 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.
International Application No. PCT/US2023/074344, International Preliminary Report on Patentability mailed on Mar. 27, 2025, 10 pages.
International Application No. PCT/US2023/074344, International Search Report and Written Opinion, mailed On Dec. 19, 2023, 13 pages.
International Application No. PCT/US2024/028744, International Search Report and Written Opinion mailed on Jul. 23, 2024, 16 pages.

International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.
Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
Mampage et al., "A Holistic View on Resource Management in Serverless Computing Environments Taxonomy and Future Directions", Research Gate, ACM Computing Surveys, 2022, 34 pages.
Marketplace Management, Available online at: https://www.appxite.com/platform/manage-marketplace?hsLang=en, 2022, 4 pages.
Marketplace Setup, Available online at: https://www.appxite.com/platform/launch-marketplace?hsLang=en, 2022, 3 pages.
Microsoft Learn, "Azure Key Vault REST API reference", Apr. 19, 2023, Available online at <https://learn.microsoft.com/en-us/rest/api/keyvault/>, 12 pages.
Microsoft Learn: "Connect to a Key Vault via private endpoint—Code Samples", Jul. 6, 2022, Available online at <https://learn.microsoft.com/en-us/samples/azure/azure-quickstart-templates/key-vault-private-endpoint/>, 5 pages.
Nolle, "Operational Strategies for Isolation in Cloud Computing", Tech Target, Sep. 15, 2021, 6 pages.
Organization Governance for Google Cloud Marketplace, Available online at: https://cloud.google.com/marketplace/docs/governance, Accessed from internet on Jan. 18, 2023, 1 page.
Palanisamy, "Cloud-based and Containerized Testing Environments Revolutionizing Text Automation", International Journal of Science and Research Archive, 2021, 11 pages.
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Resell Cloud Marketplace Products from Independent Software Vendors (ISVs), Available online at: https://cloud.google.com/marketplace/docs/partners/resell, Accessed from internet on Jan. 18, 2023, 1 page.
Set up your Cloud Marketplace Products for Resale, Available online at: https://cloud.google.com/marketplace/docs/partners/resell/set-up-reselling, Accessed from internet on Jan. 18, 2023, 2 pages.
U.S. Appl. No. 18/498,964, Non-Final Office Action mailed on Jul. 29, 2025, 23 pages.
U.S. Appl. No. 18/537,902, Non-Final Office Action, mailed on May 20, 2025, 10 pages.
U.S. Appl. No. 18/368,870, Non-Final Office Action mailed on Mar. 31, 2025, 11 pages.

(56) References Cited

OTHER PUBLICATIONS

U.S. Appl. No. 18/368,884, Non-Final Office Action mailed on Mar. 6, 2025, 44 pages.
U.S. Appl. No. 18/468,037, Non-Final Office Action mailed on Mar. 20, 2025, 8 pages.
U.S. Appl. No. 18/468,044, Non-Final Office Action mailed on May 19, 2025, 22 pages.
U.S. Appl. No. 18/468,047, Non-Final Office Action mailed on May 23, 2025, 11 pages.
Vanbenschoten et al., "Enabling the Next Generation of Multi-Region Applications with CockroachDB", Available Online at https //www cockroachlabs com/pdf/SIGMOD2022 pdf, Jun. 11, 2022, 14 pages.
Vidich, "Microsoft Publishes Secure Isolation Guidance for Azure and Azure Government", Microsoft, Dev Blogs, Aug. 31, 2020, 6 pages.
Want to Resell Public Cloud Services?, Available online At: https:// ngkloud.com/resell-public-cloud/, 2021, 3 pages.
What is AWS Marketplace, Available online at: https://docs.aws. amazon.com/marketplace/latest/userguide/what-is-marketplace. html, Accessed from internet on Jan. 18, 2023, 5 pages.
What is Azure Marketplace?, Available online At: https://learn. microsoft.com/en-us/marketplace/azure-marketplace-overview? source=recommendations, Dec. 30, 2022, 9 pages.
What is Google Cloud Marketplace?, Available online at: https:// cloud.google.com/marketplace/docs, Accessed from internet on Jan. 18, 2023, 2 pages.

Yedida et al., "Partitioning Cloud-based Microservices", Research Gate, via Deep Learning, Sep. 29, 2021, 11 pages.
Brassil, Physical Layer Network Isolation in Multi-tenant Clouds, Institute of Electrical and Electronics Engineers 30th International Conference on Distributed Computing Systems Workshops, Jul. 2010, pp. 77-81.
Study of Software as a Service Support Platform for Small and Medium Businesses Chang-Jie Guo, Wei Sun, Zhong-Bo Jiang, Ying Huang, Bo Gao, and Zhi-Hu Wang (Year: 2011).
U.S. Appl. No. 18/368,863, Non-Final Office Action mailed on Jun. 17, 2025, 11 pages.
U.S. Appl. No. 18/368,881, Non-Final Office Action mailed on Jan. 6, 2026, 25 pages.
U.S. Appl. No. 18/468,037, Notice of Allowance mailed on Dec. 23, 2025, 9 pages.
U.S. Appl. No. 18/468,047, Final Office Action mailed on Jan. 15, 2026, 10 pages.
U.S. Appl. No. 18/498,964 , Notice of Allowance, Mailed On Nov. 18, 2025, 10 pages.
E2E Network Slicing—Key 5G technology—What is it? Why do we need it? How do we implement it? By Harrison et al.(Year: 2015).
U.S. Appl. No. 18/647,735, Non-Final Office Action mailed on Jul. 21, 2025, 25 pages.
U.S. Appl. No. 18/647,741, Non-Final Office Action mailed on Nov. 4, 2025, 17 pages.
U.S. Appl. No. 18/647,893, Notice of Allowance mailed on Sep. 15, 2025, 9 pages.
U.S. Appl. No. 18/647,971, Non-Final Office Action mailed on Oct. 10, 2025, 16 pages.

* cited by examiner

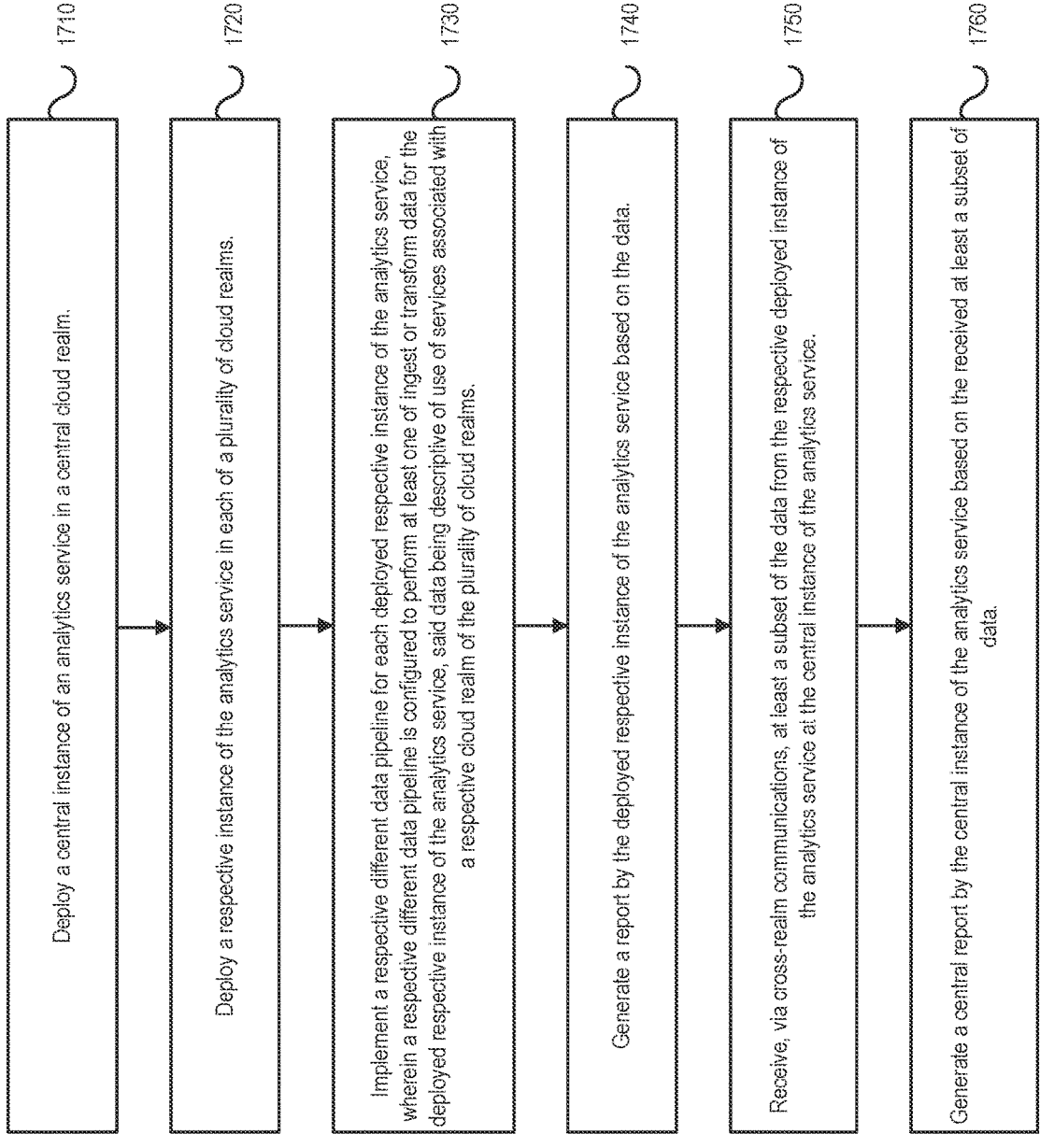

Deploy a central instance of an analytics service in a central cloud realm.

1710

Deploy a respective instance of the analytics service in each of a plurality of cloud realms.

1720

Implement a respective different data pipeline for each deployed respective instance of the analytics service, wherein a respective different data pipeline is configured to perform at least one of ingest or transform data for the deployed respective instance of the analytics service, said data being descriptive of use of services associated with a respective cloud realm of the plurality of cloud realms.

1730

Generate a report by the deployed respective instance of the analytics service based on the data.

1740

Receive, via cross-realm communications, at least a subset of the data from the respective deployed instance of the analytics service at the central instance of the analytics service.

1750

Generate a central report by the central instance of the analytics service based on the received at least a subset of data.

SYSTEM AND METHOD FOR TWO-TIER REPORTING FOR CLOUD COMPUTING REALMS

CLAIM OF PRIORITY AND CROSS-REFERENCE TO RELATED APPLICATIONS

This application claims the benefit of priority to U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,882, filed Apr. 28, 2023; and is related to U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,868, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,875, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,878, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,880, filed Apr. 28, 2023; and U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,885, filed Apr. 28, 2023; each of which above applications and the contents thereof are herein incorporated by reference.

COPYRIGHT NOTICE

TECHNICAL FIELD

Embodiments described herein are generally related to systems and methods for providing cloud environments, for use by tenants of a cloud infrastructure environment in accessing software products, services, or other offerings associated with the environment, including systems and methods for enriching cloud usage data.

BACKGROUND

A cloud computing environment can be used to provide access to a range of complementary cloud-based components, such as software applications or services, that enable organizations or enterprise customers to operate their applications and services in a highly-available hosted environment.

The benefits to an organization in moving their application and service needs to a cloud environment include a reduction in the cost and complexity of designing, building, operating, and maintaining their own on-premise data center, software application framework, or other information technology infrastructure; allowing them to instead focus on managing their day-to-day business.

SUMMARY

Embodiments described herein are generally related to systems and methods for providing cloud environments, for use by tenants of a cloud infrastructure environment in accessing software products, services, or other offerings associated with the environment, including enriching cloud usage data.

In accordance with an embodiment, cloud computing environments, such as private label cloud (PLC) environments, can enable third parties to become a cloud service provider (CSP) or extend existing CSP offerings as a managed service provider (MSP). To support this, a realm operator can be provided with comprehensive dashboards, reports, and tools to analyze critical aspects of their business, customers, and future trends.

In accordance with an embodiment, systems and methods are provided for two-tier reporting for cloud computing realms. An exemplary method can deploy a central instance of an analytics service in a central cloud realm. The method can further deploy a respective instance of the analytics service in each of a plurality of cloud realms. The method can implement a respective different data pipeline for each deployed respective instance of the analytics service, wherein a respective different data pipeline is configured to perform at least one of ingest or transform data for the deployed respective instance of the analytics service, said data being descriptive of use of services associated with a respective cloud realm of the plurality of cloud realms. The method can generate a report by the deployed respective instance of the analytics service based on the data. The method can receive, via cross-realm communications, at least a subset of the data from the respective deployed instance of the analytics service at the central instance of the analytics service. The method can generate a central report by the central instance of the analytics service based on the received at least a subset of data. The method can be performed on one or more computers comprising one or more microprocessors.

BRIEF DESCRIPTION OF THE DRAWINGS

FIG. 17 is a flowchart of an exemplary method, in accordance with an embodiment.

DETAILED DESCRIPTION

A cloud computing or cloud infrastructure environment can be used to provide access to a range of complementary cloud-based components, such as software applications or services, which enable organizations or enterprise customers to operate their applications and services in a highly-available hosted environment.

The benefits to an organization in moving their application and service needs to a cloud infrastructure environment include a reduction in the cost and complexity of designing, building, operating, and maintaining their own on-premise data center, software application framework, or other information technology infrastructure; allowing them to instead focus on managing their day-to-day business.

Cloud Infrastructure Environments

Figure 1:
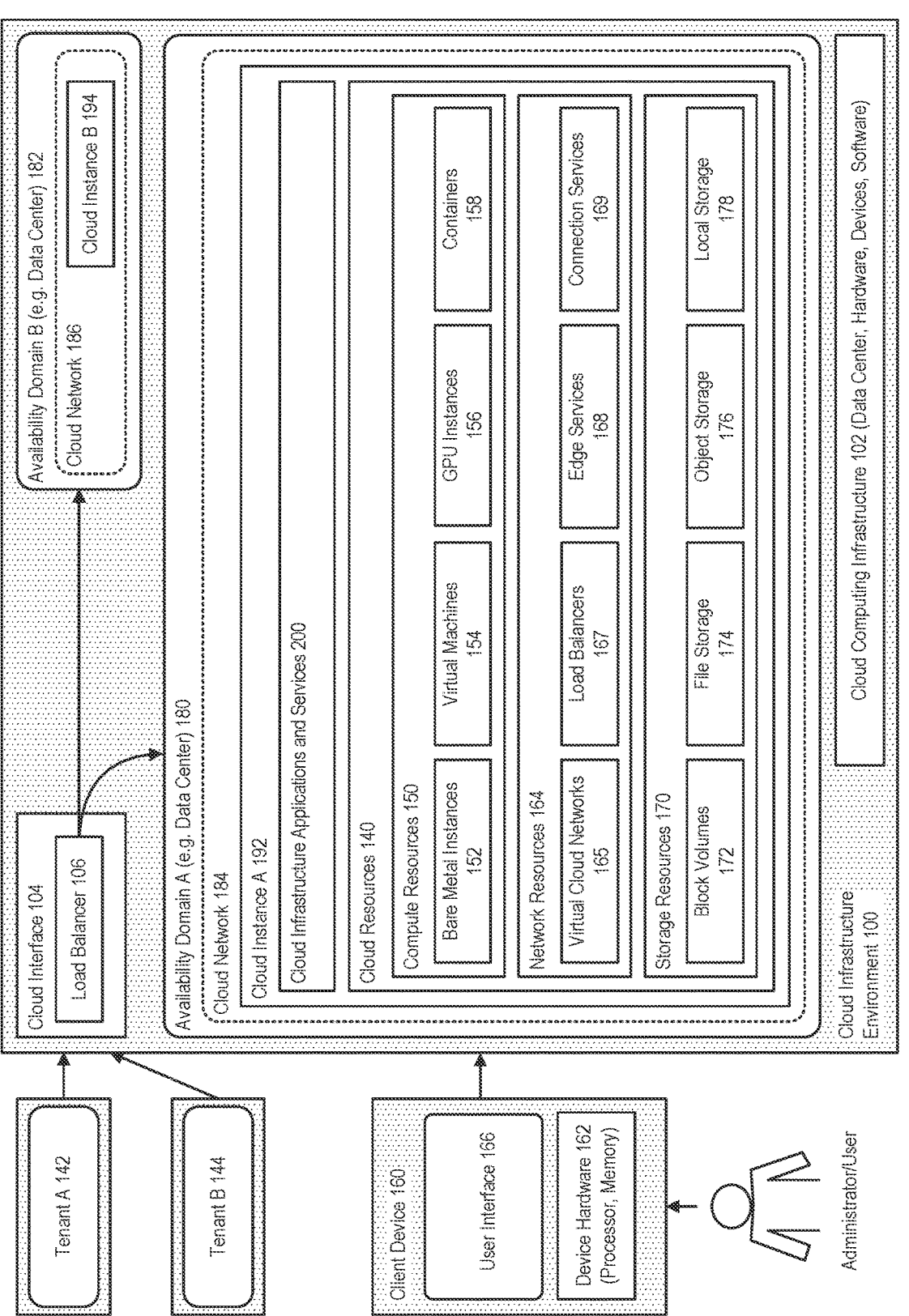
FIG. 1 illustrates a system for providing a cloud infrastructure environment, in accordance with an embodiment.
Figure 2:
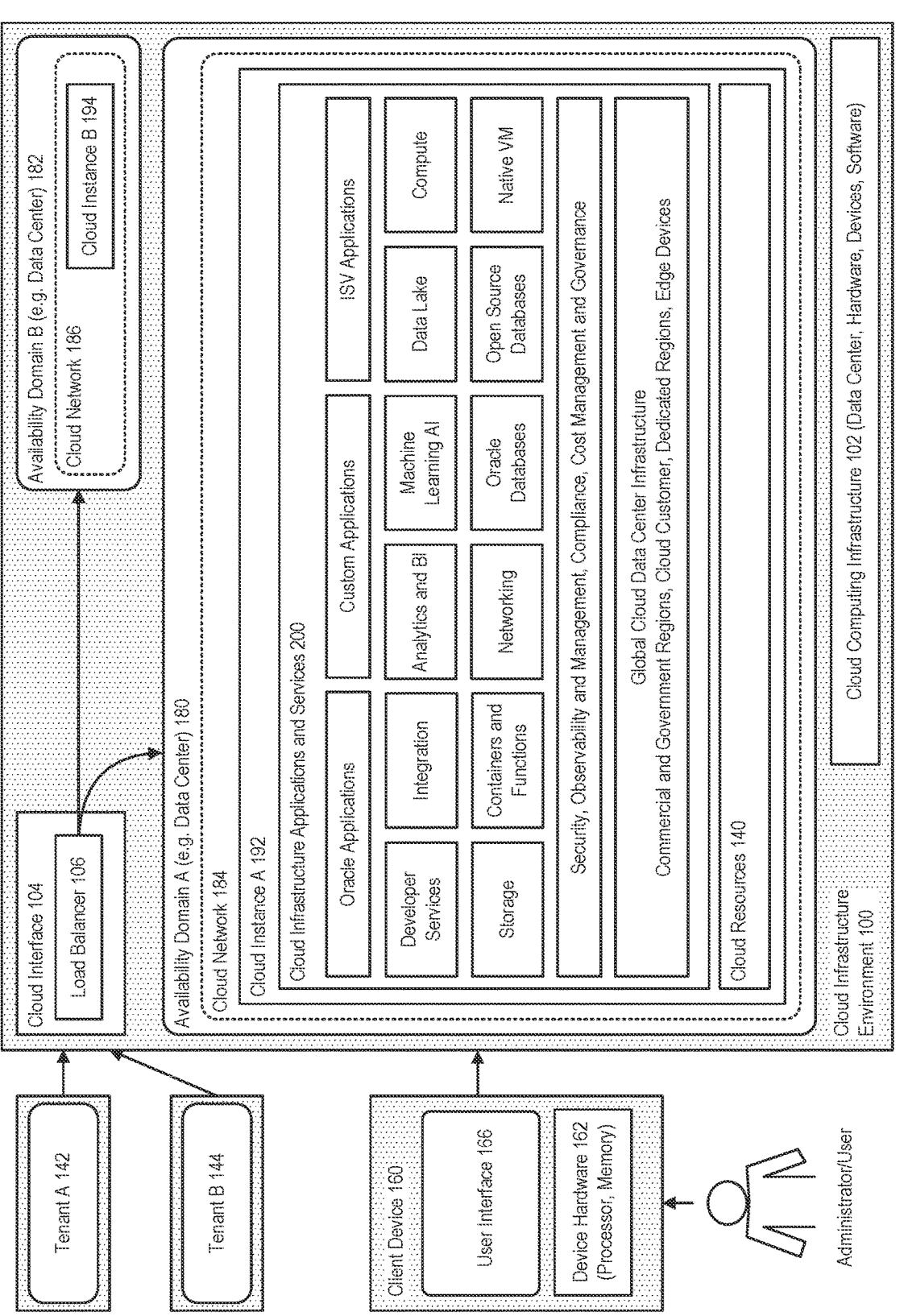
FIG. 2 further illustrates how a cloud infrastructure environment can be used to provide cloud-based applications or services or services, in accordance with an embodiment.

FIGS. 1 and 2 illustrate a system for providing a cloud infrastructure environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers 106.

In accordance with an embodiment, the cloud infrastructure environment supports the use of availability domains, such as, for example, availability domains A 180, B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 140 via, for example, a compute resources layer 150, a network resources layer 164, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 165, load balancers 167, edge services 168, and/or connection services 169.

In accordance with an embodiment, the storage resources layer can comprise a number of resources, such as, for example, data/block volumes 172, file storage 174, object storage 176, and/or local storage 178.

As illustrated in FIG. 2, in accordance with an embodiment, the cloud infrastructure environment can include a range of complementary cloud-based components, for example as cloud infrastructure applications and services 200, that enable organizations or enterprise customers to operate their applications and services in a highly-available hosted environment.

By way of example, in accordance with an embodiment, a self-contained cloud region can be provided as a complete, e.g., Oracle Cloud Infrastructure (OCI) dedicated region within an organization's data center that offers the data center operator the agility, scalability, and economics of a public cloud, while retaining full control of their data and applications to meet security, regulatory, or data residency requirements.

For example, in accordance with an embodiment, such an environment can include racks physically and managed by a cloud infrastructure provider; customer's racks; access for cloud operations personnel for setup and hardware support; customer's data center power and cooling; customer's floor space; an area for customer's data center personnel; and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's public cloud regions, such as, for example, ERP, Financials, HCM, and SCM. A customer can seamlessly lift and shift legacy workloads using the cloud infrastructure provider's services, for example bare metal compute, VMs, and GPUs; database services, for example Autonomous Database; or container-based services, for example Container Engine for Kubernetes.

In accordance with an embodiment, a cloud infrastructure environment can operate according to infrastructure-as-a-service (IaaS) model that enables the environment to provide virtualized computing resources over a public network (e.g., the Internet).

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components (example services include billing software, monitoring software, logging software, load balancing software, or clustering software). Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not be, a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries, or daemons). This is often managed by the cloud infrastructure provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In accordance with an embodiment, IaaS provisioning may refer to acquiring computers or virtual hosts for use, and even installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 3:
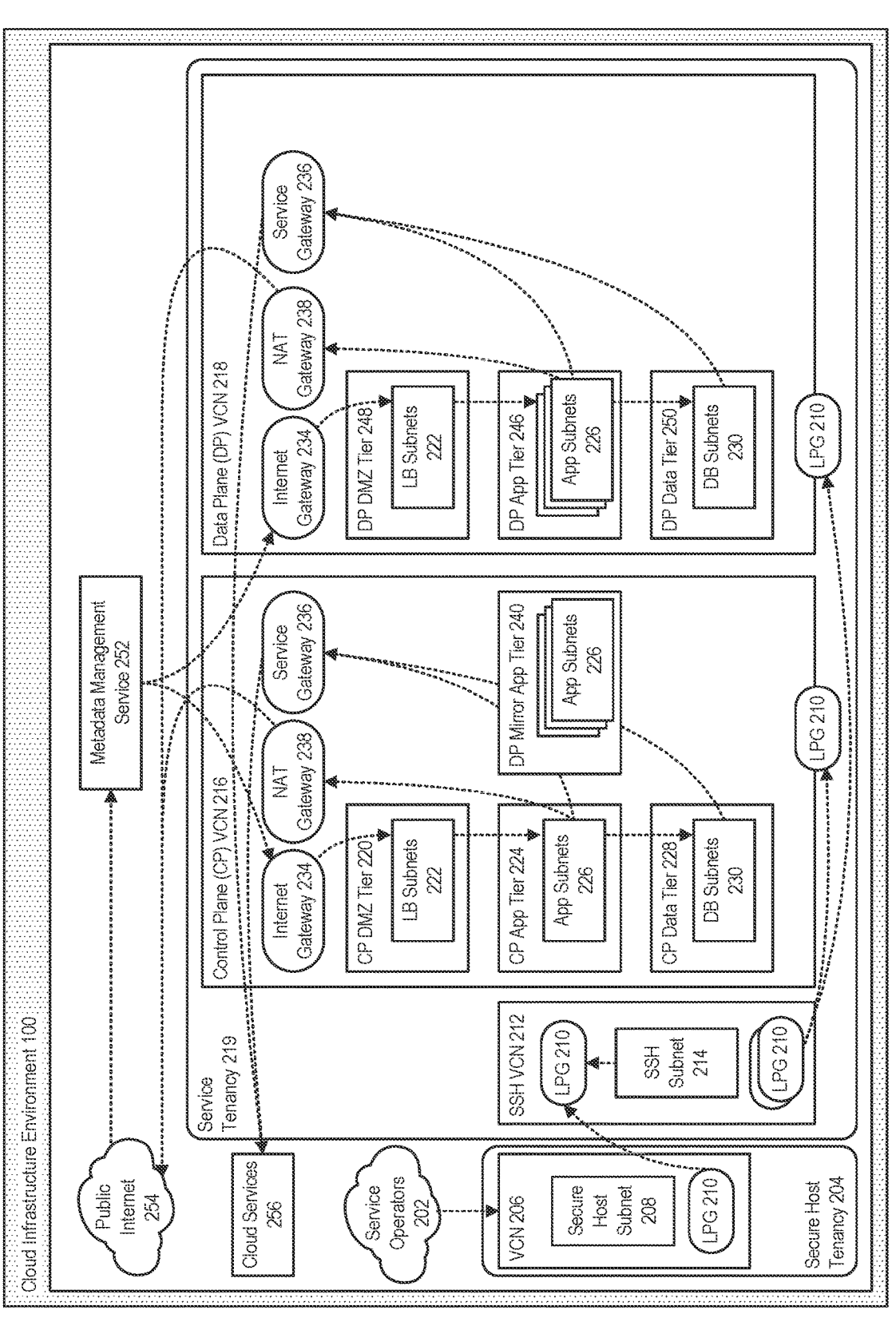
FIG. 3 illustrates an example cloud infrastructure architecture, in accordance with an embodiment.

FIG. 3 illustrates an example cloud infrastructure architecture, in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices, which may be portable handheld devices (e.g., a telephone, a computing tablet, a personal digital assistant (PDA)) or wearable devices (e.g., a head mounted display), running software such as Microsoft Windows, and/or a variety of mobile operating systems such as iOS, Android, and the like, and being Internet, e-mail, short message service (SMS), or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Chrome. Alternatively, or in addition, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnet(s) 222, a control plane app tier 224 that can include app subnet(s) 226, and a control plane data tier 228 that can include database (DB) subnet(s) 230 (e.g., frontend DB subnet(s) and/or backend DB subnet(s)). The LB subnet(s) contained in the control plane DMZ tier can be communicatively coupled to the app subnet(s) contained in the control plane app tier, and an Internet gateway 234 that can be contained in the control plane VCN, and the app subnet(s) can be communicatively coupled to the DB subnet(s) contained in the control plane data tier and a service gateway 236 and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier 246, a data plane DMZ tier 248, and a data plane data tier 250. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way: the service gateway can make API calls to cloud services, and cloud services can send requested data to the service gateway. Generally, cloud services may not initiate API calls to the service gateway.

In accordance with an embodiment, the secure host tenancy can be directly connected to the service tenancy, which may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example create, read, update, or delete (CRUD) operations, through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both of which may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage, which may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy, which may be isolated from the public Internet.

Figure 4:
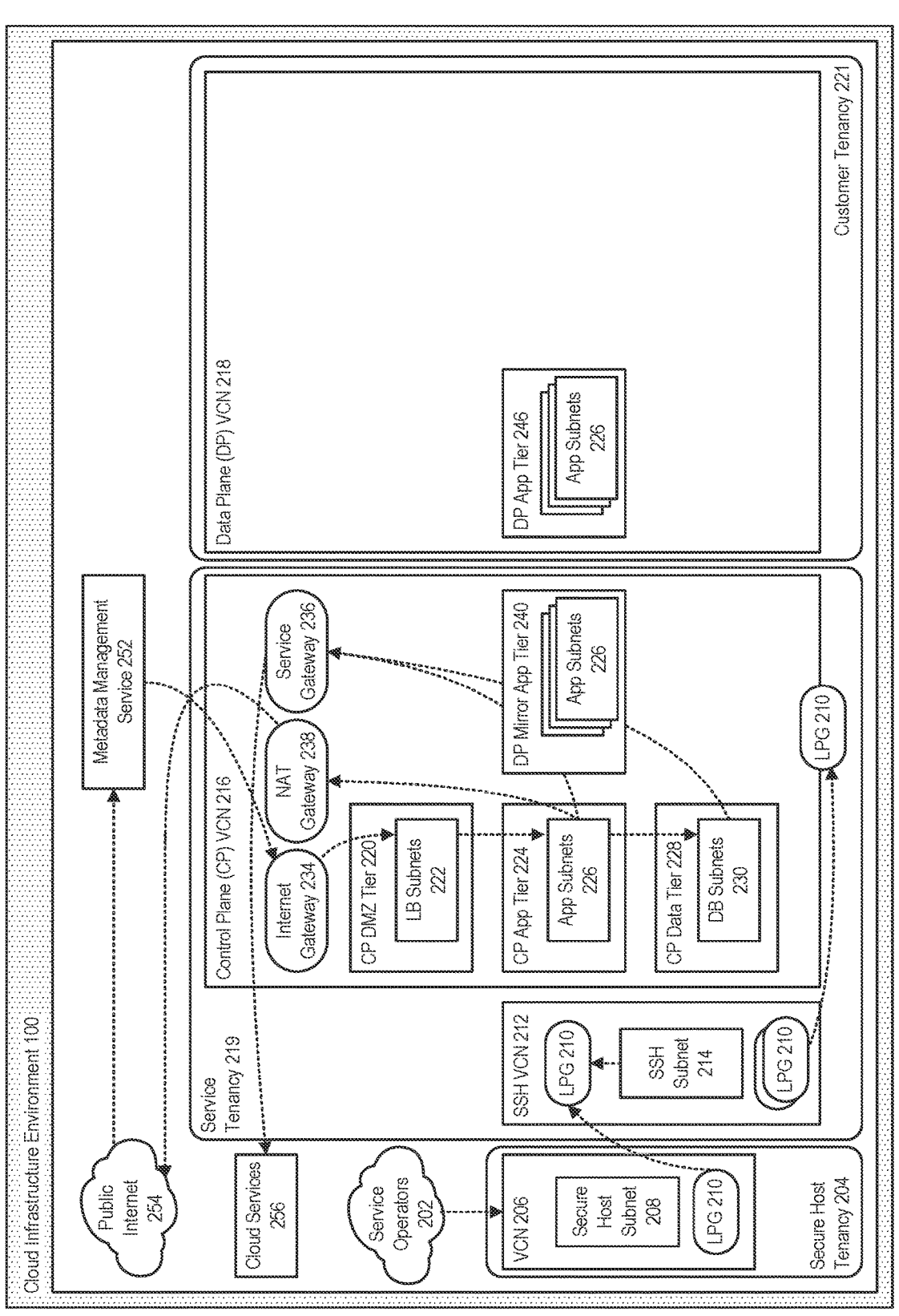
FIG. 4 illustrates another example of a cloud infrastructure architecture, in accordance with an embodiment.

FIG. 4 illustrates another example of a cloud infrastructure architecture, in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources that are provisioned in the control plane VCN that is contained in the service tenancy, to be deployed or otherwise used in the data plane VCN that is contained in the customer tenancy.

In accordance with an embodiment, a customer of the cloud infrastructure provider may have databases that are managed and operate within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, of the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with Deployment 1 in Region 2.

Figure 5:
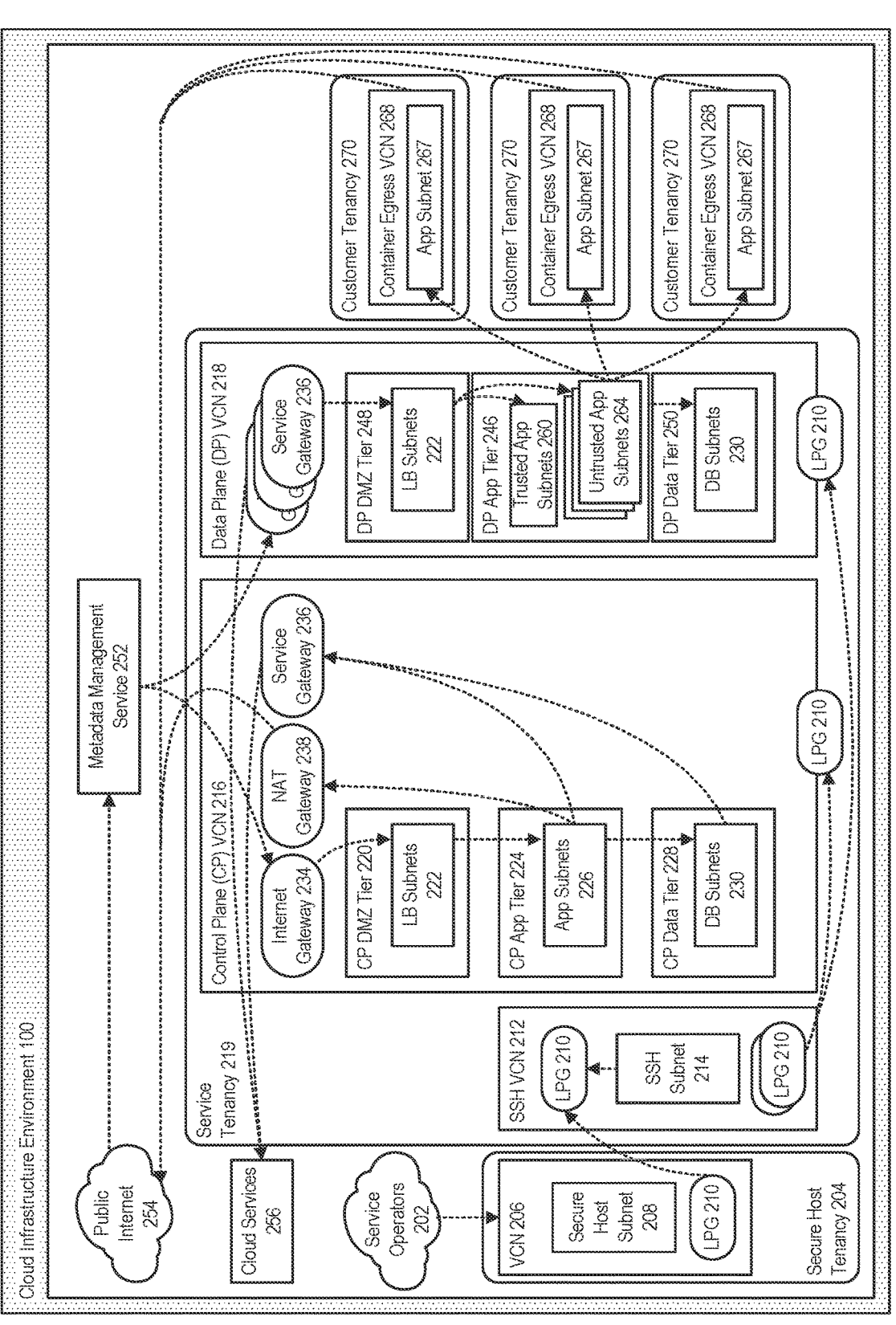
FIG. 5 illustrates another example of a cloud infrastructure architecture, in accordance with an embodiment.

FIG. 5 illustrates another example of a cloud infrastructure architecture, in accordance with an embodiment.

As illustrated in FIG. 5, in accordance with an embodiment, the trusted app subnet(s) 260 can be communicatively coupled to the service gateway contained in the data plane VCN, the NAT gateway contained in the data plane VCN, and DB subnet(s) contained in the data plane data tier. The untrusted app subnet(s) 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs, and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)), which may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s), and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled; or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
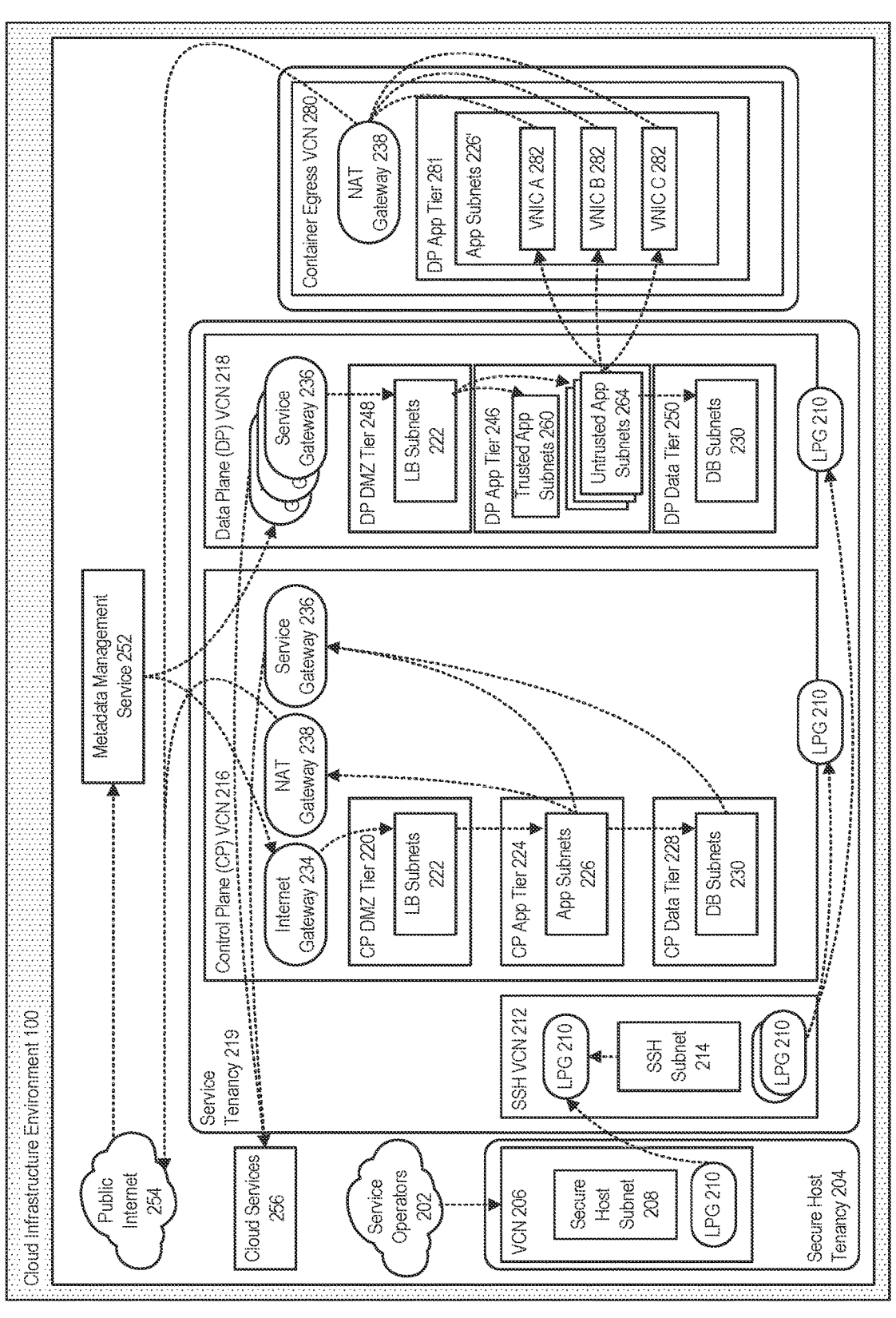
FIG. 6 illustrates another example of a cloud infrastructure architecture, in accordance with an embodiment.

FIG. 6 illustrates another example of a cloud infrastructure architecture, in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container, and be communicatively coupled to an app subnet that can be contained in a data plane app tier 281 that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that requests a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Cloud Environments

In accordance with an embodiment, a cloud infrastructure environment can be used to provide dedicated cloud environments, for example as one or more private label cloud environments, for use by tenants of the cloud infrastructure environment in accessing subscription-based software products, services, or other offerings associated with the cloud infrastructure environment.

Figure 7:
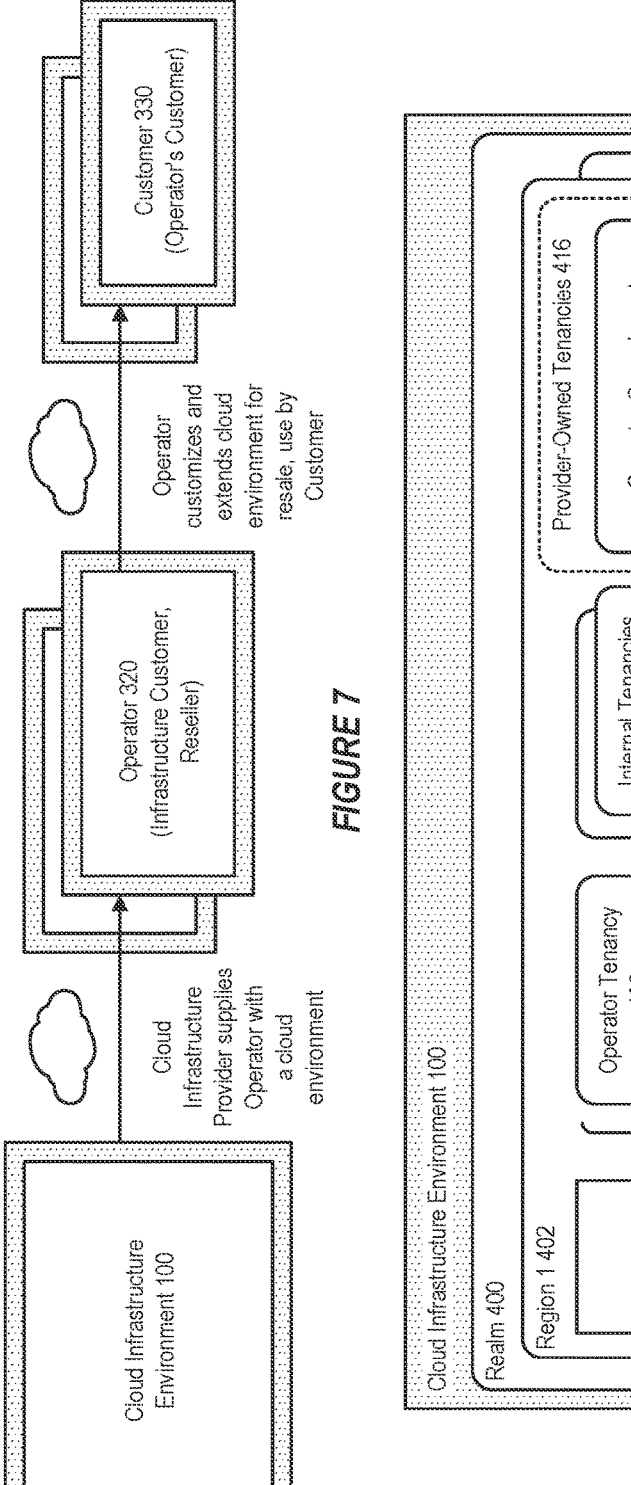
FIG. 7 illustrates a system that provides dedicated or private label cloud environments, for use by tenants or customers of a cloud infrastructure environment, in accordance with an embodiment.

FIG. 7 illustrates how the system can provide dedicated or private label cloud environments, for use by tenants or customers of a cloud infrastructure environment, in accordance with an embodiment.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

As illustrated in FIG. 7, in accordance with an embodiment, a cloud infrastructure provider can supply an operator 320, for example a cloud infrastructure customer operating as a reseller, with one or more cloud environments (e.g., a PLC environment) or realms. The operator/reseller can then customize and extend the cloud environment for use by (their) customer 330, for use in accessing subscription-based software products, services, or other offerings associated with the cloud infrastructure environment.

For purposes of illustration, examples of such subscription-based products, services, or other offerings may include various cloud infrastructure software products, such as Oracle Fusion Applications products, or other types of products or services that allow customers to subscribe to usage of those products or services.

Figure 8:
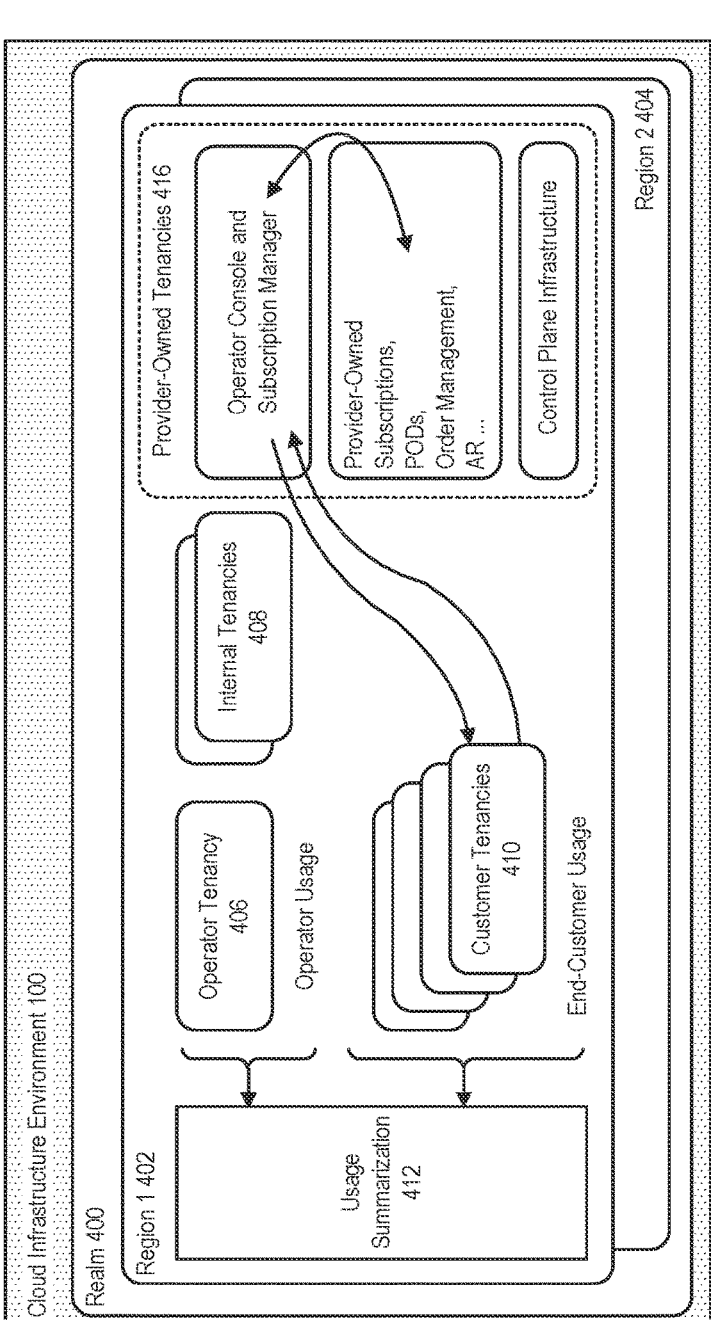
FIG. 8 further illustrates the use of cloud realms, for use by tenants or customers of a cloud infrastructure environment, in accordance with an embodiment.

FIG. 8 further illustrates the use of cloud realms, for use by tenants or customers of a cloud infrastructure environment, in accordance with an embodiment.

As illustrated in FIG. 8, in accordance with an embodiment, the system can include a cloud subscription service or component, referred to herein in some embodiments as a subscription manager, that exposes one or more subscription management APIs for creating orders used to onboard new customers, or to launch a workflow that creates a subscription and orchestrates billing and pricing service or other components for use with a cloud realm 400.

In accordance with an embodiment, when an operator (e.g., a PLC operator) or their customer requests a cloud environment, the system creates a realm, for use within a region 402, 404; together with one or more provider-owned tenancies 416. These tenancies allow a region to function with its required service infrastructure; and are administered by the cloud infrastructure provider.

In accordance with an embodiment, a first step in the process is to create an operator tenancy 406 for the operator, before the region and associated realms are turned over to them for subsequent management. The operator then becomes the administrator of this tenancy, within which they can view and manage everything that happens within that region, including their customer accounts and usage 412 by those customers of cloud resources.

Generally, once the region has been turned over or provided to the operator, the cloud infrastructure provider cannot subsequently access the data within the operator tenancy, unless the operator authorizes the cloud infrastructure provider to do so, for example to provide troubleshooting of issues that may arise.

In accordance with an embodiment, the operator can then create additional internal tenancies 408, intended for their own use internally, for example to assess what the end user or customer experience will be, or to provide a sales demo tenancy, or to operate a database for their own internal use. The operator can also create one or more customer tenancies 410, of which the end user or customer will be the administrator. Cloud infrastructure usage, for example compute, storage, and other infrastructure resources, is consolidated by operator, reflecting both their usage and that of their customers, and reported to the cloud infrastructure provider.

In accordance with an embodiment, a user interface or console can be provided that allows the operator to manage its customer accounts and customer-offered services. A cloud infrastructure provider can also use a cloud infrastructure tenancy, for example a Fusion Applications tenancy, to install any needed infrastructure services for use by the operator and their customers.

Figure 9:
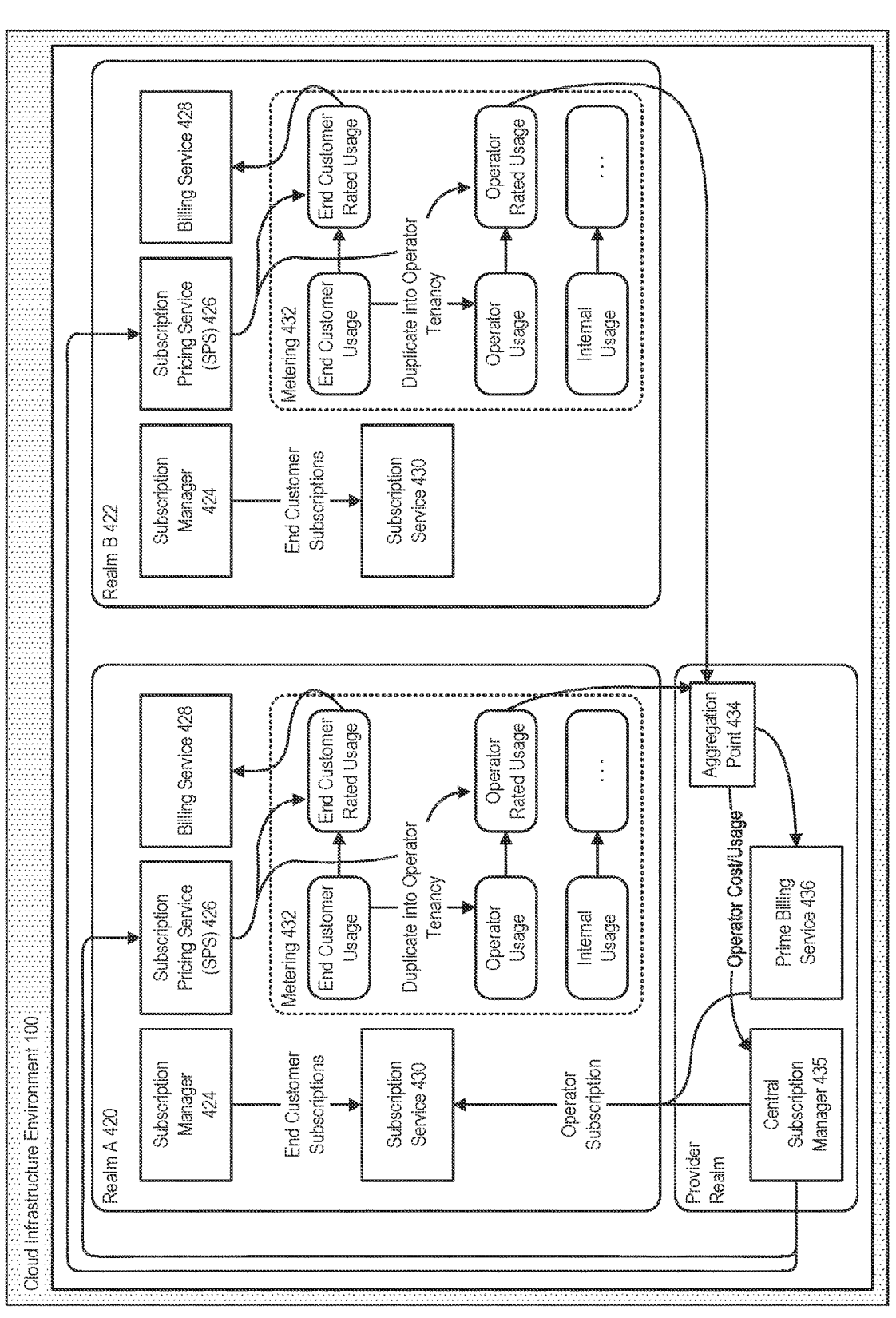
FIG. 9 further illustrates the use of cloud realms, for use by tenants or customers of a cloud infrastructure environment, in accordance with an embodiment.

FIG. 9 further illustrates the use of cloud realms, for use by tenants or customers of a cloud infrastructure environment, in accordance with an embodiment.

As illustrated in FIG. 9, in accordance with an embodiment, a subscription manager 424 service or component exposes one or more subscription management APIs for creating orders used to onboard new customers, or to launch a workflow that creates a subscription and orchestrates billing and pricing service or other components.

In accordance with an embodiment, the system can also include a billing service 428 or component that operates upon a billing account or logical container of subscriptions and preferences used to produce an invoice for a customer.

In accordance with an embodiment, the system can also include a subscription pricing service (SPS) 426 or component, which operates upon a product catalog that defines which products can be purchased by a customer, and can be used to provide a price list (e.g., a rate card) that the pricing service also owns.

In accordance with an embodiment, to support the sales process through which a subscription is created in a realm 420, 422, products can be selected from a product hub. Once an order is created via a subscription service 430, a subscription is created in the subscription manager which thereafter manages the life cycle of that subscription, and provisions what needs to be provisioned in downstream services. The SPS component then manages the aspects of pricing and usage, for use in charging the end cost to the operator or their ability to charge their customers. Usage events are forwarded to the billing service or component, where depending on the billing preferences of the subscription, invoices are created and pushed to an accounts receivables component.

In accordance with an embodiment, although the services that are offered in a realm report their usage to a metering service or component 432, such usage does not have any price associated with it. A rating process determines how much each specific event costs, for example by applying rate cards, determines a unit and cost for that subscription, associates the cost to that record, and then forwards that to the billing service or component.

As further illustrated in Figure, 9, in accordance with an embodiment, an operator may control multiple realms A, B—for example an operator that operates in multiple countries may wish to operate a data center that is completely isolated for the United States of America, and a separate data center that is completely isolated for Europe, for example to address governance or regulatory requirements. In accordance with an embodiment, the usage associated with these multiple realms can be aggregated 434, for use by a central subscription manager 435, and where applicable a prime billing service 436, in billing the operator.

The examples of various systems illustrated above are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Cloud Subscriptions

Figure 10:
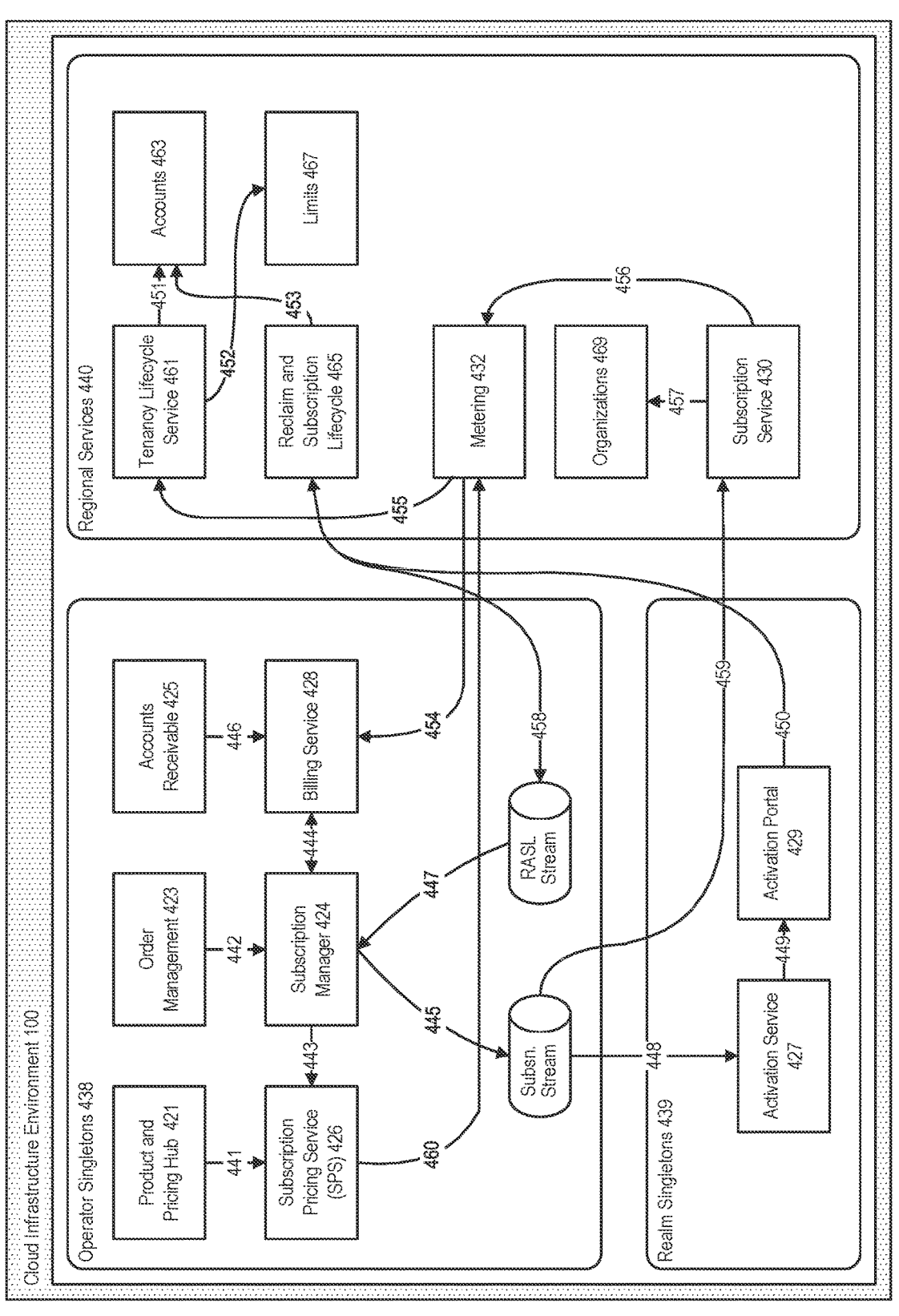
FIG. 10 illustrates a system for providing access to software products or services in a cloud computing or other computing environment, in accordance with an embodiment.

FIG. 10 illustrates a system for providing access to software products or services in a cloud computing or other computing environment, in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various cloud infrastructure software products or services that allow customers to subscribe to usage of those products or services.

In accordance with an embodiment, the environment can include a plurality of components provided as operator singletons 438, realm singletons 439, and regional services 440, as further described below.

In accordance with an embodiment, a subscription can include artifacts such as, for example, products, commits, billing model, and state. The subscription manager service or component can expose one or more subscription management APIs for creating orders used to onboard new customers, or to launch a workflow that creates a subscription and orchestrates creating the proper footprints in billing and pricing service or components, as further described below.

In accordance with an embodiment, the billing service or component operates upon a billing account or logical container of subscriptions and preferences used to produce an invoice. Each billing account generates one invoice per billing cycle. The billing service includes a first pipeline that accepts usage and cost from a metering service or component through a REST API, wherein billing writes the usage to a database from which billing workers aggregate and calculate balances; and a second pipeline responsible for taking the aggregated usage and commitments and calculating charges over a billing interval.

In accordance with an embodiment, the subscription pricing service (SPS) 426 or component operates upon a product catalog that defines which products can be purchased by a customer. The product catalog forms the backbone of a price list (i.e., rate card) that the pricing service also owns. Rate cards are modeled as pricing rules on top of public list prices. The pricing service maintains a single price list for all products, new product prices can be added, and existing prices changed. The price list has a full history, the latest version being the current rate card. Since some contracts may require a snapshot of the rate card be taken, the pricing service handles this by recording the time a customer's rate card is created, and then querying the price list at that time.

In accordance with an embodiment, the SPS or pricing service is responsible for communicating with a product and pricing hub 421, to provide information about products, global price list, and end user or customer's subscription specific price lists and discounts. For example, in accordance with an embodiment, SPS can synchronize product information from a product hub, and a global price list from a pricing hub.

In accordance with an embodiment, the subscription manager service or component operates as an upstream service to receive new order requests from an order management 423 component, for example from an Oracle Fusion Order Management environment. The subscription manager service or component can provide subscription information to the SPS service, including subscription details such as time of quote configured, or subscription type (Commitment, PayG), to help SPS to determine an effective base price (Rate Card) for the subscription. The subscription manager service or component can also send discounts for subscriptions received from the order management component, which SPS stores as a pricing rule entity.

In accordance with an embodiment, the SPS service runs as a background process to manage a rate cards service or component, which is responsible for generating rate cards for new subscriptions and updating those rate cards when new price changes occur. The SPS service can provide APIs to access rate cards and pricing rules. A metering in-line rating engine can utilize these APIs to obtain subscription-specific rate cards and pricing rules, and then use this data for cost calculations.

In accordance with an embodiment, additional SPS components can include, for example, a pricing/product hub integration component, that allows an operator entity providing subscription-based products, services, or other offerings within the environment, to manage their product and price list, for example as provided by a product hub and pricing hub respectively.

For example, in accordance with such an embodiment, an SPS product integration flow can listen to create/update events in the product hub and make calls to an SPS product API. Similarly, an SPS pricing integration flow can pull new price list creation from the pricing hub and call respective SPS pricing APIs.

In accordance with an embodiment, the system can also include an SPS core module that provides APIs to manage and access pricing entities. Pricing entities can be accessed by internal services, for example an inline rating engine.

In accordance with an embodiment, the system can also include a rate card manager component. The SPS service maintains the single base price for a product at a given time. However, product prices for subscription are dependent on a base price at quote configuration time and price list change policy attributes of subscriptions. The SPS service internally maintains the price to be used for subscription using these properties. All such price lists are grouped in a rate card. The rate card manager can create and maintain the rate card, listen to price list changes and update existing rate cards with the new price, and listen to new subscriptions and assigns the rate card based on subscription properties.

In accordance with an embodiment, the SPS service is responsible for managing pricing rules for a subscription, including discounts offered to an end user or customer. Pricing rules eligibility can be based on attributes of products, such as discount group, product category or specific SKUs. Internally SPS needs to identify the list of products for which these rules will be applicable. To accomplish this, a rule decoder engine can compile the pricing rules in a format such that an in-line rating engine can consume the information for cost calculation. This compilation process can be triggered when products or pricing rules are created or updated.

As illustrated by way of example in FIG. 10, in accordance with an embodiment: at 441, a product and price information managed in, e.g., Fusion Applications, is sent to the SPS component.

At 442, orders are sent to the subscription manager component to create subscriptions, rate cards and billing accounts.

At 443, pricing configuration and pricing rules are sent to SPS for new orders.

At 444, the subscription manager component is used to set up a billing account in the billing service or component.

At 445, the subscription manager component publishes events to an subscription manager streaming component.

At 446, a charge data is sent to an accounts receivable component 425 to generate invoices.

At 447, the subscription manager component consumes reclaim and subscription lifecycle (RASL) events from subscription manager streaming.

At 448, an activation service 427 reads the subscription manager event stream.

At 449, a customer obtains activation data from an activation portal 429.

At 450, a tenancy lifecycle service 461 provisions a tenancy as part of the subscription activation.

At 451, the tenancy lifecycle service creates, within an accounts 463 component, an accounts footprint during account provisioning.

At 452, the tenancy lifecycle service sets, within a limits service 467, a limits template during account provisioning.

At 453, the accounts component acts as a downstream RASL client to handle a legacy reclamation and subscription lifecycle 465.

At 454, aggregated cost and usage is sent to the billing service 428 or component.

At 455, an organization can create child tenancies using the tenancy lifecycle service.

At 456, a metering service 432 or component obtains subscription mapping data.

At 457, the subscription service 430 obtains organization data 469 for subscription mappings.

At 458, the RASL component reads the subscription manager event stream.

At 459, the subscription service reads the subscription manager event stream; and at 460, the metering service or component obtains a rate card data for each subscription, which can then be used in charging the end cost to the operator or their ability to charge their customers.

The above examples are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Two-Tier Reporting

In accordance with an embodiment, cloud computing environments, such as private label cloud (PLC) environments, can enable third parties to become a cloud service provider (CSP) or extend existing CSP offerings as a managed service provider (MSP). To support this, a realm operator can be provided with comprehensive dashboards, reports, and tools to analyze critical aspects of their business, customers, and future trends.

In accordance with an embodiment, the described systems and methods can provide a two-tiered reporting solution. A full-stack data lake and analytics service (referred to herein in some embodiments as Horizon) can be bootstrapped or implemented within separate realms, such as, for example, separate PLC realms, and cross-realm communications can be enabled via a cross-realm bridge.

In accordance with an embodiment, by providing a data lake and analytics service within each realm, operators associated with the various realms can be provided with self-contained, in-realm analytics capabilities to protect data sovereignty and privacy. The operators can take advantage of conformed dimensions to assess their data in the context of their cloud, augmented with their own data, e.g., customer, business, support, and operational data.

In accordance with an embodiment, each operator can also establish their own data pipeline to ingest and transform data to generate dashboards/reports for key aspects of their cloud operations (e.g., businesses run in/associated with cloud platforms). The operators can use cross-realm data transfer to export data as needed, for example to cloud provider realms for specific needs, e.g., metering data for service usage calculation, usage/reservation data for capacity planning.

In accordance with an embodiment, within a realm, the data lake and analytics service ingests data that reflects all aspects of the operator's operations—for example, engineering, financial, or customer data. The system operates to make this type of information available to the realm operator; while protecting proprietary or customer information held within an operator's realm; and at the same time, providing the cloud infrastructure provider with some degree of visibility into the operator environment.

In accordance with an embodiment, the systems and methods can provision an instance of a data lake and analytics service within a cloud provider realm, as well as provisioning an instance of the data lake and analytics service in one or multiple operator realms within the cloud environment. Such provisioning can be performed by, for example, using a temporary bootstrap application or process. Each data lake and analytics instance operates as its own entity, but can also support interfaces that address cloud infrastructure provider needs.

In accordance with an embodiment, the systems and methods can also operate to receive the information from the cloud provider realm that it needs to support the operator's environment. Data flow is along two paths—ingested into a data warehouse and made available to the operator, and utilizing a cross-realm bridge to bring some data back to the cloud provider realm.

In accordance with an embodiment, a realm operator has access to an operator access tenancy (OAT) and corresponding identity cloud service (IDCS) stripe within the data warehouse. To implement a data analytics instance in an operator realm, the analytics and data lake service can be registered in the operator access tenancy and IDCS stripe associated with that operator. The analytics and data lake service is created in a cloud provider tenancy, but needs to be registered or used within the IDCS stripe in the operator tenancy.

In accordance with an embodiment, during a bootstrap process, the systems and methods can create a temporary vault for use by the operator access tenancy to be registered within the IDCS stripe. Then, the systems and methods remove the operator access tenancy and the vault afterwards. This operates to prevent cloud provider operators from creating services in the IDCS stripe (i.e., in the operator's realm) after the initial bootstrap.

Figure 11:
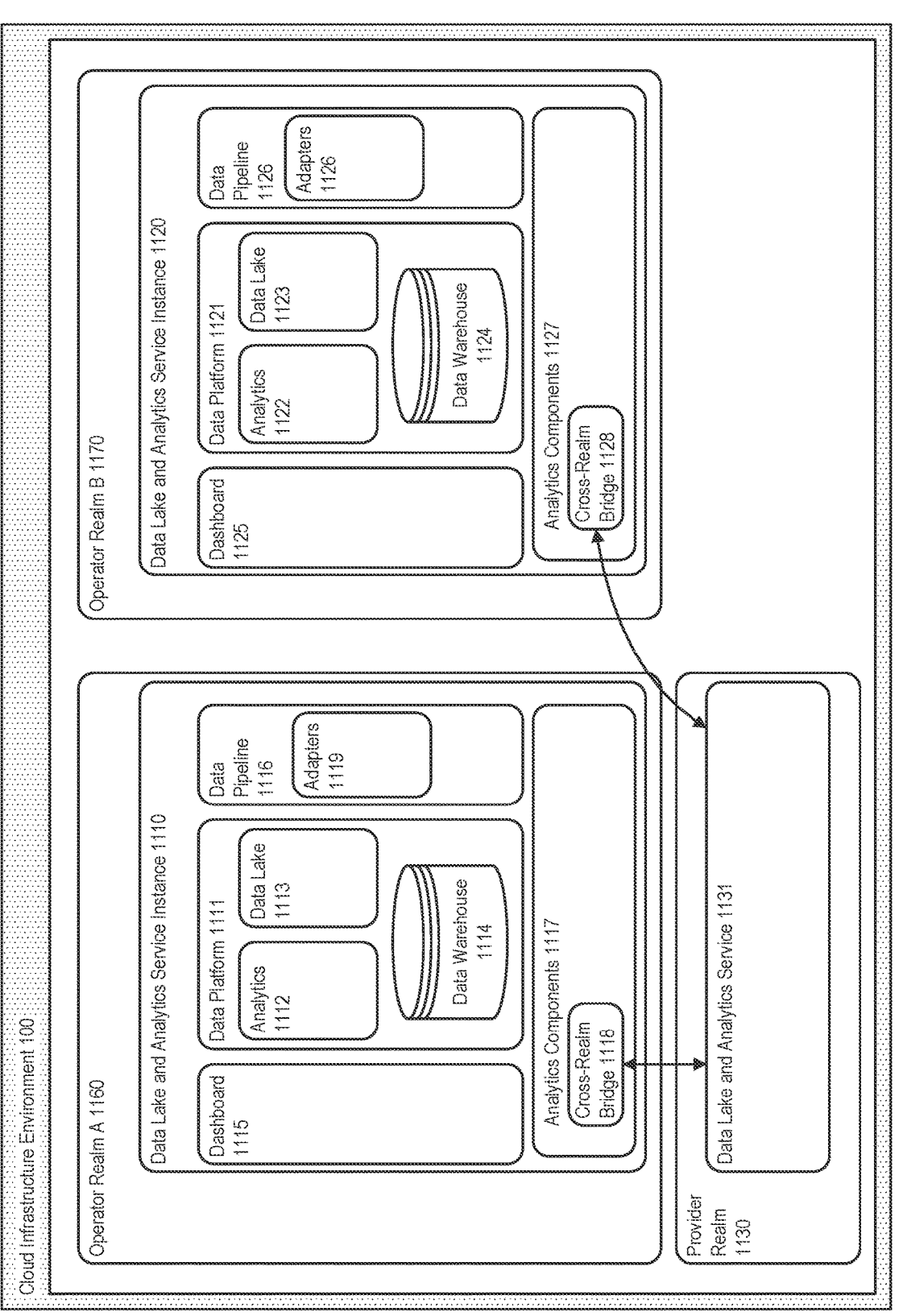
FIG. 11 further illustrates the use of cloud realms, for use by tenants or customers of a cloud infrastructure environment, in accordance with an embodiment.

FIG. 11 further illustrates the use of cloud realms, for use by tenants or customers of a cloud infrastructure environment, in accordance with an embodiment.

As illustrated in FIG. 11, in accordance with an embodiment, an analytics gathering application 1131, such as an analytics and data lake service, can be deployed in association with a provider realm 1130. Such a provider realm can be associated with a provider of the cloud infrastructure environment 100 at which the provider realm.

In accordance with an embodiment, in addition to being deployed at the provide realm, instances of the data lake and analytics service 1110 and 1120 can additionally be deployed to operator realms, such as operator A realm 1160, and operator B realm 1170.

In accordance with an embodiment, each of the data lake and analytics services, as well as the instances thereof, can comprise a plurality of components, including one or more data pipeline 1116 and 1126, data platform 1111 and 1121, dashboards/dashboard generators 1115 and 1125, and analytics components 1117 and 1127.

In accordance with an embodiment, each data platform 1111 and 1121 can comprise an analytics component 1112 and 1122, a data lake 1113 and 1123, as well as a data warehouse 1114 and 1124. In some embodiments, this data warehouse can comprise an autonomous data warehouse (ADW) instance.

In accordance with an embodiment, each of the data pipelines 1116 and 1126 can comprise a plurality of adapters 1119 and 1129, wherein each adapter is adapted to ingest data to the data lake and analytics service instance from one or more difference sources of data.

In some embodiments, for example, the adapters can comprise one or more of a database adapter, event adapter, or other type of adapter configured and adapted to connect to, and ingest data from, one or more different data sources.

In accordance with an embodiment, the analytics components associated with each of the data lake and analytics service instances can also comprise a plurality of components, including an analytics control plane, machine learning, automated deployment (referred to herein in some embodiments as Shepard), interface components (e.g., public APIs, identity and access management, Splat, as well as a cross-realm bridge 1118 and 1128.

In accordance with an embodiment, the instances of the data lake and analytics service can be deployed in association with or in the context of operator realms in order to improve the reporting capabilities provided by the operator realms and tenancies.

In accordance with an embodiment, in order to improve the reporting capabilities, a plurality of dashboards can be automatically generated by the dashboards 1115 and 1125, including a revenue dashboard, a service consumption dashboard, an operations dashboard, a customer support dashboard, and a capacity planning dashboard.

For example, in accordance with an embodiment, a revenue dashboard can be automatically generated. A revenue dashboard can provide reports that show the number of customers and amount of revenue generated on a per-service basis. These automatically generated dashboards can include certain features, such as top revenue-generating customers, top gainers, top decliners, and period-over-period changes in trends.

As another example, in accordance with an embodiment, a service consumption dashboard can be automatically generated. Such a dashboard can provide insights into consumption of services in native units (e.g., processor unit hours), and can also provide visibility into customer adoption of cloud products and services.

As another example, in accordance with an embodiment, an operations dashboard can be automatically generated and can provide a variety of perspectives across operational a plurality of key performance indicators (e.g., CASE metrics) to reduce the effect of customer-impacting incidents and build consistency in operations.

As another example, in accordance with an embodiment, a customer support dashboard can be automatically generated. Such a customer support dashboard can enable operators to monitor end-customer support performance and take prompt action to improve customer experience.

As another example, in accordance with an embodiment, a capacity planning dashboard can be automatically generated. Such a capacity planning dashboard can enable operators to track usage and manage capacity to meet customer needs in a more efficient way.

In accordance with an embodiment, the data lake and analytics service, as well as the instances thereof, can host the data to support all subject areas. In addition to pulling data that is internal to the cloud infrastructure environment, data external to the cloud infrastructure environment may become necessary. In order to pull such data, one or more data pipelines can be provided that will allow data to be pulled from sources of data external to cloud infrastructure environment (e.g., customer and revenue data, support data, and more).

In accordance with an embodiment, the dashboards that are generated and provided can be accessed via, e.g., a cloud console. Such dashboards can additionally be packaged as part of an automated deployment.

In accordance with an embodiment, the systems and methods support full stack capabilities for each instance of the data lake and analytics service that is deployed in each realm. Such full stack services include, for example, data ingestion adapters, control plane, admin portal, autonomous data warehouse, and analytics services.

In accordance with an embodiment, a cross-realm bridge can be provided in association with each instance of the data lake and analytics service that is deployed in each realm. While regular, in-realm analytics can address most operators/analytics needs, there can exist some use cases that require consolidated view of data from different realms. The data lake and analytics service can support cross-realm data transfer, via a cross-realm bridge, for approved use cases (e.g., metering data, capacity planning, etc.). The data can be transferred from the operator realm (e.g., 1160 or 1170) to the provider realm 1130. In addition to supporting data transfer from the operator realms to the provider realms, the cross-realm bridges can additionally be utilized to transfer data between realms owned by a same operator.

In accordance with an embodiment, by providing such a cross-realm bridge barrier, such measures can support or provide data security for realm operators as operators from the provider realm can be limited or restricted from access to realm operator data via the cross-realm bridge. Dashboards generated via the data lake and analytics service at the prover realm can utilize data gathered by the data lake and analytics service 1131 from original data sources, as well as data pulled from operator realms via the cross-realm bridges.

Figure 12:
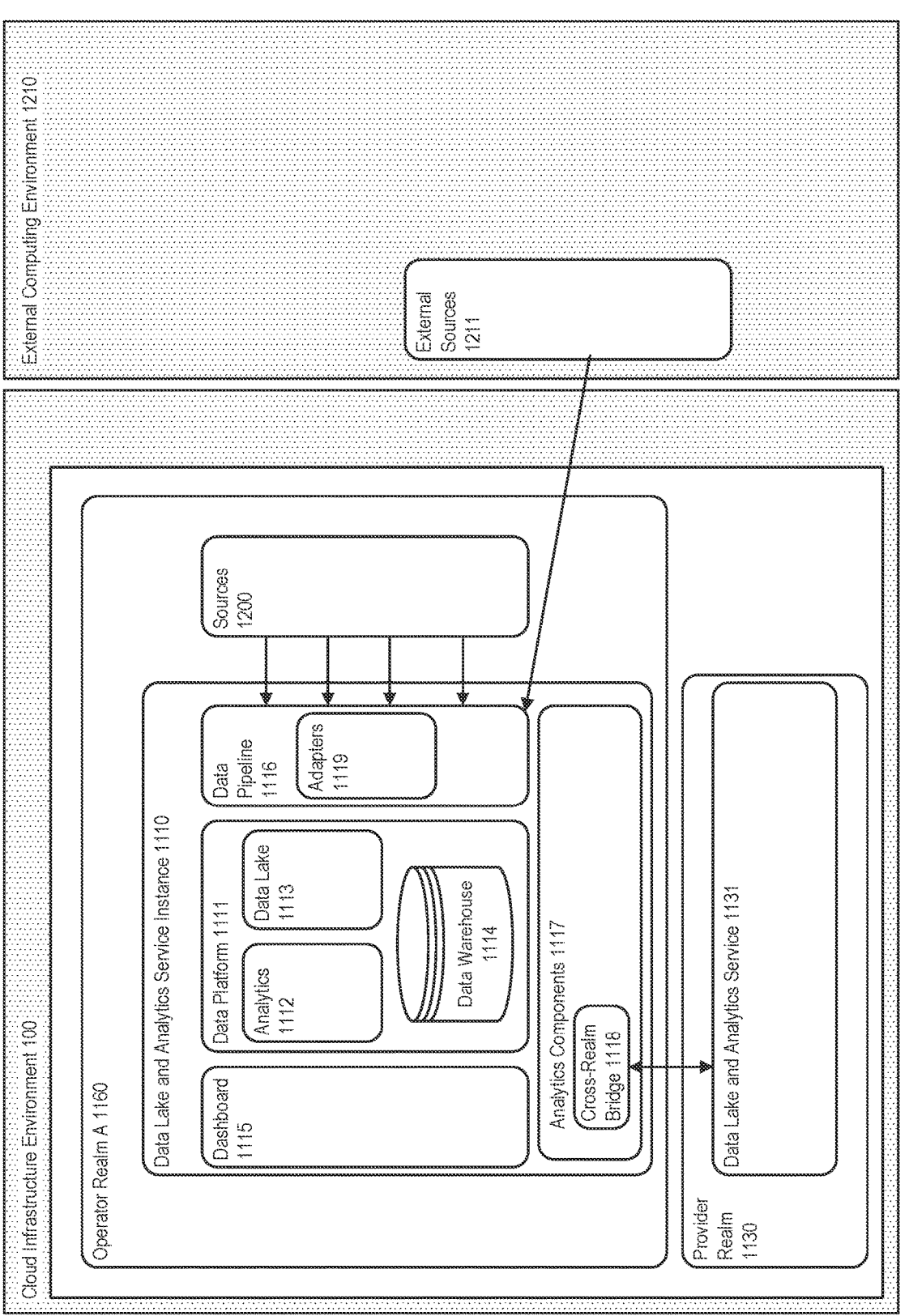
FIG. 12 further illustrates the use of cloud realms, for use by tenants or customers of a cloud infrastructure environment, in accordance with an embodiment.

FIG. 12 further illustrates the use of cloud realms, for use by tenants or customers of a cloud infrastructure environment, in accordance with an embodiment.

As illustrated in FIG. 12, in accordance with an embodiment, an analytics application 1131, such as an analytics and data lake service, can be deployed in association with a provider realm 1130. Such a provider realm can be associated with a provider of the cloud infrastructure environment 100 at which the provider realm.

In accordance with an embodiment, in addition to being deployed at the provide realm, and instance of the data lake and analytics service 1110 can additionally be deployed to an operator realm, such as operator A realm 1160.

In accordance with an embodiment, the data lake and analytics services, as well as the instances thereof, can comprise a plurality of components, including data pipeline 1116, data platform 1111, dashboards/dashboard generators 1115, and analytics components 1117.

In accordance with an embodiment, the data platform 1111 can comprise analytics 1112, data lake 1113, as well as data warehouse 1114. In some embodiments, this data warehouse can comprise an autonomous data warehouse (ADW) instance.

In accordance with an embodiment, the data pipelines 1116 can comprise a plurality of adapters 1119, where each adapter is adapted to ingest data to the data lake and analytics service instance from one or more difference sources 1200 and 1211 of data.

In accordance with an embodiment, as shown in FIG. 12, such data pipeline 1116 can comprise adapters 1119 that are configured or adapted to ingest data from sources both internal to the cloud infrastructure environment 100 (e.g., sources 1200 provided in the context of the operator realm), as well as external sources of data 1211 that can be provided in an external computing environment 1210. Such external sources of data can comprise, for example, databases or other data sources maintained by the operator of realm A that are not hosted within the cloud infrastructure environment.

In some embodiments, for example, the adapters can comprise one or more of a database adapter, event adapter, or other type of adapter configured and adapted to connect to, and ingest data from, one or more different data sources.

In accordance with an embodiment, the analytics components associated with each of the data lake and analytics service instances can also comprise a plurality of components, including an analytics control plane, machine learning, automated deployment, interface components, as well as a cross-realm bridge 1118.

In accordance with an embodiment, the instances of the data lake and analytics service can be deployed in association with or in the context of operator realms in order to improve the reporting capabilities provided by the operator realms and tenancies.

In accordance with an embodiment, in order to improve the reporting capabilities, a plurality of dashboards can be automatically generated by the dashboards 1115, including a revenue dashboard, a service consumption dashboard, an operations dashboard, a customer support dashboard, and a capacity planning dashboard.

Figure 13:
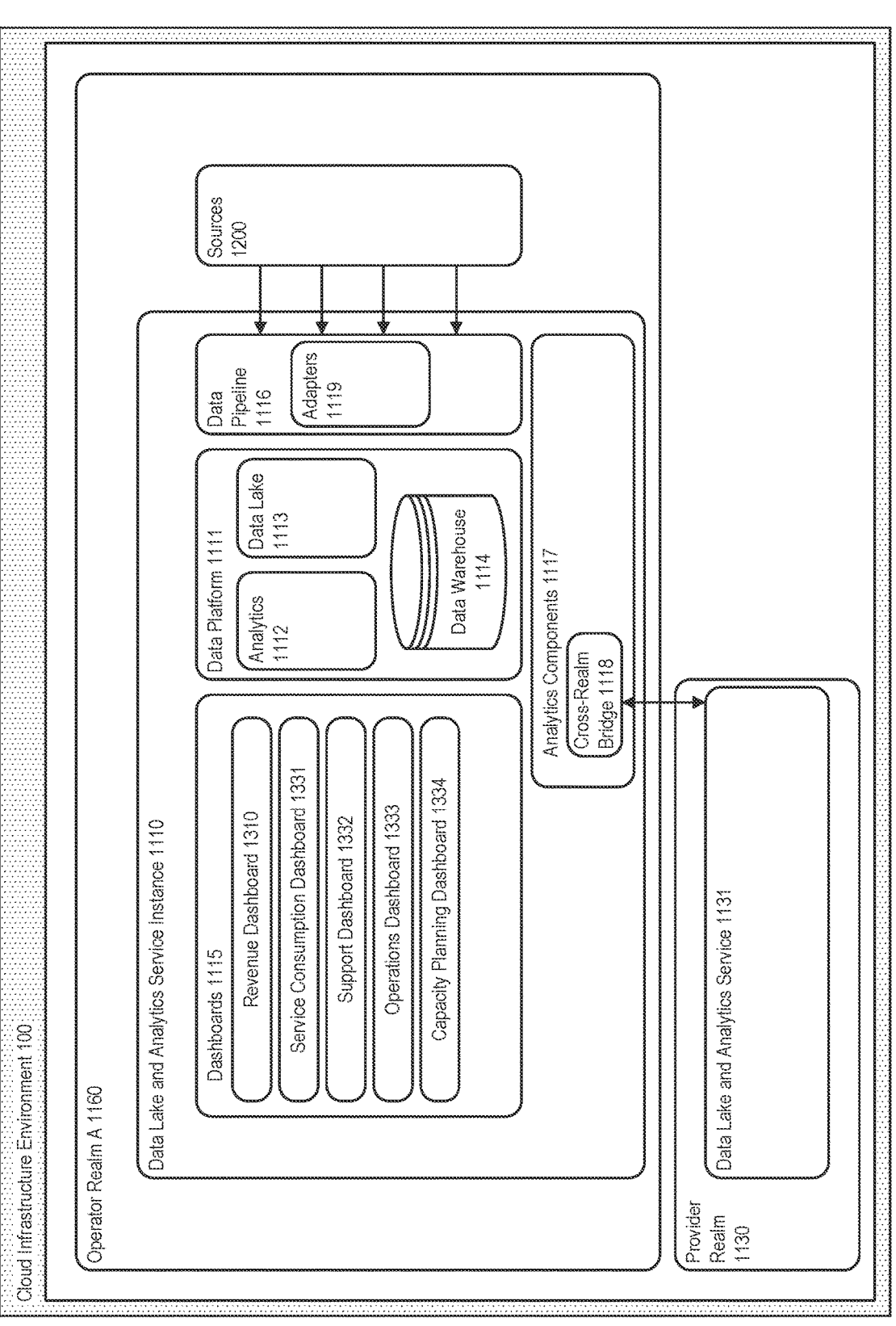
FIG. 13 further illustrates the use of cloud realms, for use by tenants or customers of a cloud infrastructure environment, in accordance with an embodiment.

FIG. 13 further illustrates the use of cloud realms, for use by tenants or customers of a cloud infrastructure environment, in accordance with an embodiment.

As illustrated in FIG. 13, in accordance with an embodiment, an analytics application 1131, such as an analytics and data lake service, can be deployed in association with a provider realm 1130. Such a provider realm can be associated with a provider of the cloud infrastructure environment 100 at which the provider realm.

In accordance with an embodiment, in addition to being deployed at the provide realm, and instance of the data lake and analytics service 1110 can additionally be deployed to an operator realm, such as operator A realm 1160.

In accordance with an embodiment, the data lake and analytics services, as well as the instances thereof, can comprise a plurality of components, including data pipeline 1116, data platform 1111, dashboards/dashboard generators 1115, and analytics components 1117.

In accordance with an embodiment, the data platform 1111 can comprise analytics 1112, data lake 1113, as well as data warehouse 1114. In some embodiments, this data warehouse can comprise an autonomous data warehouse (ADW) instance.

In accordance with an embodiment, the data pipelines 1116 can comprise a plurality of adapters 1119, where each adapter is adapted to ingest data to the data lake and analytics service instance from one or more difference sources 1200 of data.

In accordance with an embodiment, such data pipeline 1116 can comprise adapters 1119 that are configured or adapted to ingest data from sources 1200 both internal to the cloud infrastructure environment as well as external sources of data.

In some embodiments, for example, the adapters can comprise one or more of a database adapter, event adapter, or other type of adapter configured and adapted to connect to, and ingest data from, one or more different data sources.

In accordance with an embodiment, the analytics components associated with each of the data lake and analytics service instances can also comprise a plurality of components, including an analytics control plane, machine learning, automated deployment, interface components, as well as a cross-realm bridge 1118.

In accordance with an embodiment, the instances of the data lake and analytics service can be deployed in association with or in the context of operator realms in order to improve the reporting capabilities provided by the operator realms and tenancies.

In accordance with an embodiment, in order to improve the reporting capabilities, a plurality of dashboards can be automatically generated by the dashboards 1115, including a revenue dashboard 1310, a service consumption (e.g., product adoption) dashboard 1311, a customer support dashboard 1132, an operations dashboard 1333, and a capacity planning dashboard 1334.

In accordance with an embodiment, each of these dashboards can be automatically generated upon, for example, a selection of the dashboard by a user of a realm. In addition, such dashboards can be automatically generated and updated during a background process, and displayed upon selection by a user of a realm.

Figure 14:
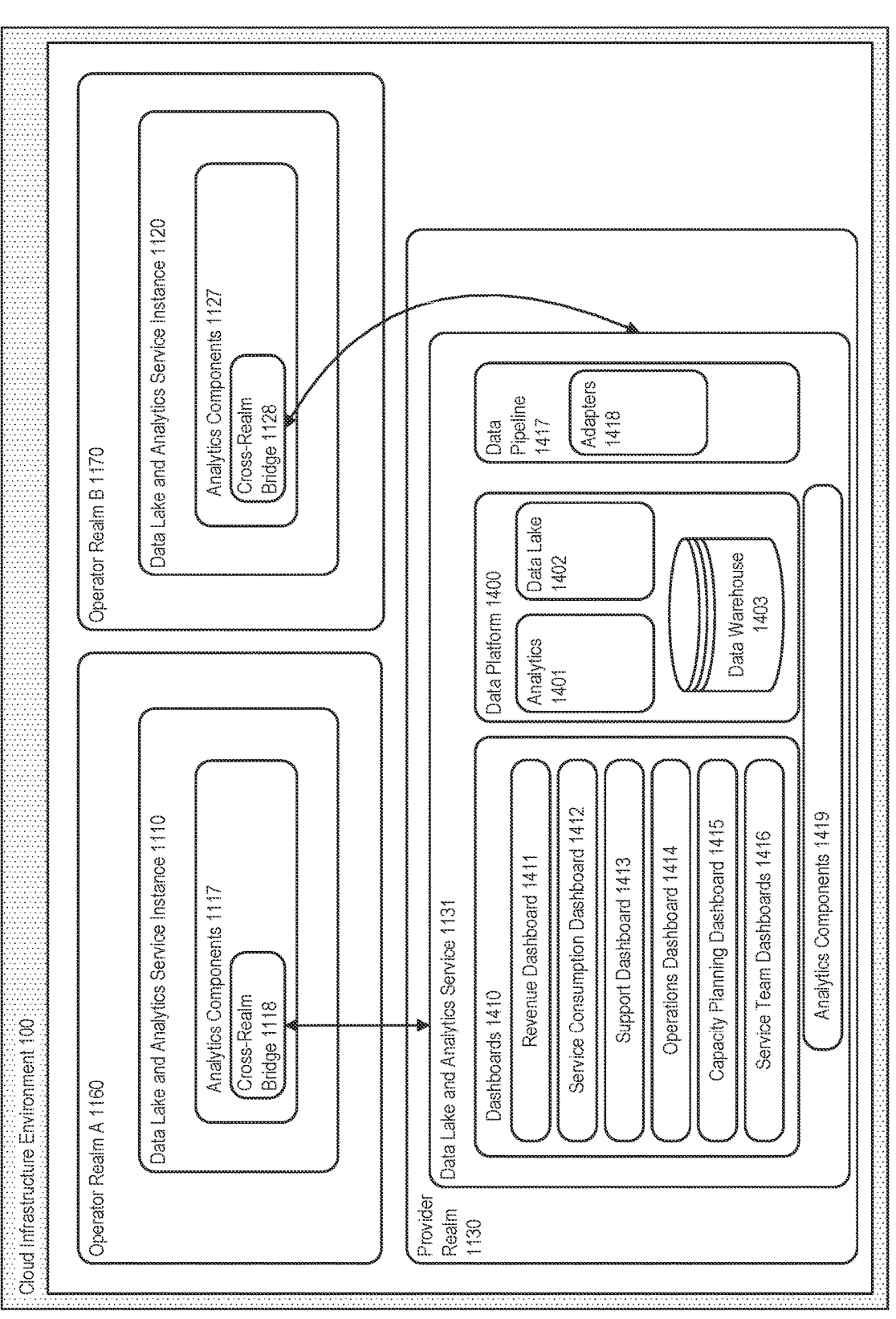
FIG. 14 further illustrates the use of cloud realms, for use by tenants or customers of a cloud infrastructure environment, in accordance with an embodiment.

FIG. 14 further illustrates the use of cloud realms, for use by tenants or customers of a cloud infrastructure environment, in accordance with an embodiment.

As illustrated in FIG. 14, in accordance with an embodiment, an analytics application 1131, such as an analytics and data lake service, can be deployed in association with a provider realm 1130. Such a provider realm can be associated with a provider of the cloud infrastructure environment 100 at which the provider realm.

In accordance with an embodiment, in addition to being deployed at the provide realm, instances of the data lake and analytics service 1110 and 1120 can additionally be deployed to operator realms, such as operator A realm 1160 and operator B realm 1170.

In accordance with an embodiment, each of the data lake and analytics services, as well as the instances thereof, can comprise a plurality of components. As illustrated in FIG. 14, the data lake and analytics serviced 1141 can comprise a data pipeline 1417, data platform 1400, dashboards/dashboard generators 1410, and analytics components 1419.

In accordance with an embodiment, the data platform 1400 can comprise analytics 1401, data lake 1402, as well as a data warehouse 1403. In some embodiments, this data warehouse can comprise an autonomous data warehouse (ADW) instance.

In accordance with an embodiment, the data pipeline 1417 comprise a plurality of adapters 1418, where each adapter is adapted to ingest data to the data lake and analytics service instance from one or more difference sources of data.

In some embodiments, for example, the adapters can comprise one or more of a database adapter, event adapter, or other type of adapter configured and adapted to connect to, and ingest data from, one or more different data sources.

In accordance with an embodiment, the analytics components associated with each of the data lake and analytics service instances can also comprise a plurality of components, including an analytics control plane, machine learning, automated deployment, interface components.

In accordance with an embodiment, the data lake and analytics service can be deployed in association with or in the context of the provider realm in order to for the provider to monitor the overall cloud infrastructure environment, including the operator realms deployed therein.

In accordance with an embodiment, a plurality of dashboards can be automatically generated by the dashboards 1410, including a revenue dashboard 1411, a service consumption (product adoption) dashboard 1412, a support dashboard 1413, an operations dashboard 1414, a capacity planning dashboard 1415, as well as a service team dashboard 1416.

In accordance with an embodiment, a cross-realm bridge 1118 and 1128 can be provided in association with each instance of the data lake and analytics service that is deployed in each operator realm. While regular, in-realm analytics can address most operators/analytics needs, there can exist some use cases that require consolidated view of data from different realms. The data lake and analytics service 1131 can support cross-realm data transfer, via a cross-realm bridge, for approved use cases (e.g., metering data, capacity planning, etc.). The data can be transferred from the operator realm (e.g., 1160 or 1170) to the provider realm 1130, via the cross-realm bridges. In addition to supporting data transfer from the operator realms to the provider realms, the cross-realm bridges can additionally be utilized to transfer data between realms owned by a same operator.

In accordance with an embodiment, by providing such a cross-realm bridge barrier, such measures can support or provide data security for realm operators as operators from the provider realm can be limited or restricted from access to realm operator data via the cross-realm bridge. Dashboards generated via the data lake and analytics service at the prover realm can utilize data gathered by the data lake and analytics service 1131 from original data sources, as well as data pulled from operator realms via the cross-realm bridges.

In accordance with an embodiment, as an example, the data transferred via the cross-realm bridges 1118 and 1128 from the operator realms can be utilized by the data lake and analytics service 1131 to support the automatic generation of the various dashboards, including, the service team dashboards. These dashboards utilized by the service teams associated with the provider realm can provide insights into, for example, the health of the operator realms, the consumption of resources, and any errors of faults that may need to be addressed by the service teams associated with the provider realm.

Figure 15:
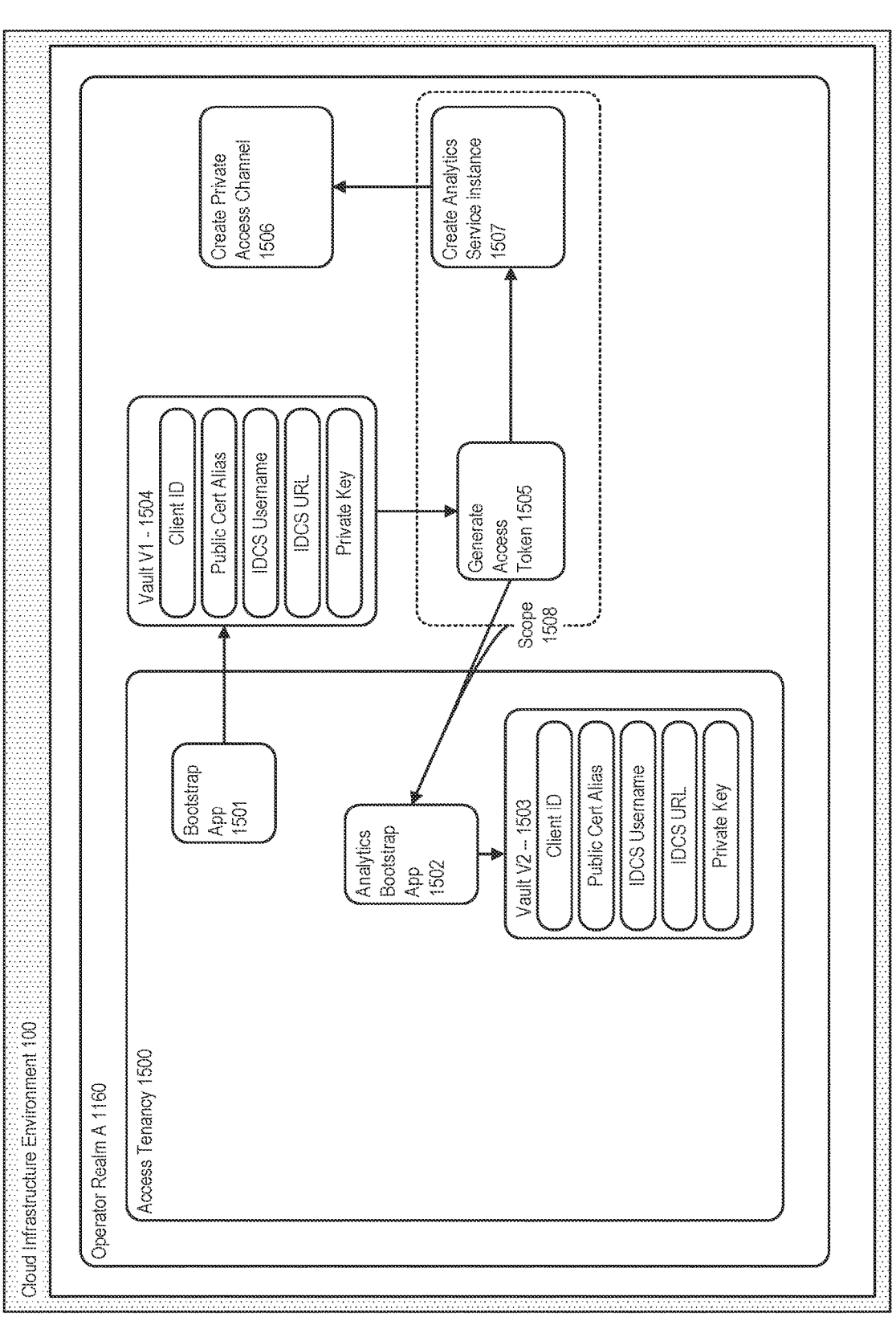
FIG. 15 illustrates an example bootstrapping process within a cloud infrastructure environment, in accordance with an embodiment.

FIG. 15 illustrates an example bootstrapping process within a cloud infrastructure environment, in accordance with an embodiment.

In accordance with an embodiment, the above described instances of the data lake and analytics service can be deployed within the context of an operator realm. This process of deploying such instances can be performed via a bootstrapping method as depicted within FIG. 15.

In accordance with an embodiment, the data lake and analytics service does not have access to create identity and access management (e.g., IDCS) groups or domains within an access tenancy 1500, such as an operator access tenancy. In order to deploy instances of the data lake and analytics service, an administrator application, such as bootstrap application 1501 can be created within an access tenancy within operator realm A 1160.

In addition, an otherwise-hidden identity and access management username (U1, generally a non-administrator user) local to the application can also be created. A public key can be imported into the application 1501; and the private key, identity and access management username (U1), and the applications 1501 app client_id can be shared within a vault path V1 1504.

In accordance with an embodiment, the data lake and analytics service application can utilize the information from vault V1 to create or generate an access token 1505, which can be utilized to create an analytics application bootstrap application 1502 in the context of an identity and access management associated with the access tenancy (e.g., an IDCS stripe).

Additionally, the access token can be utilized to create an analytics service instance (e.g., an Oracle Analytics Cloud, OAC instance) 1507, which can be utilized to create a private access channel 1506. The access token can be utilized to import a public key to bootstrap application 1502, which can then store its client_id, private key and application username (U1) to a vault path V2 1503.

In this way, the information is utilized to establish an instance of the data lake and analytics service within an access tenancy 1500. Once the instance of the analytics service is created 1507, the data lake and analytics service adds a scope 1508 of analytics service to the instance in analytics bootstrap application, using the vault V1 details.

Figure 16:
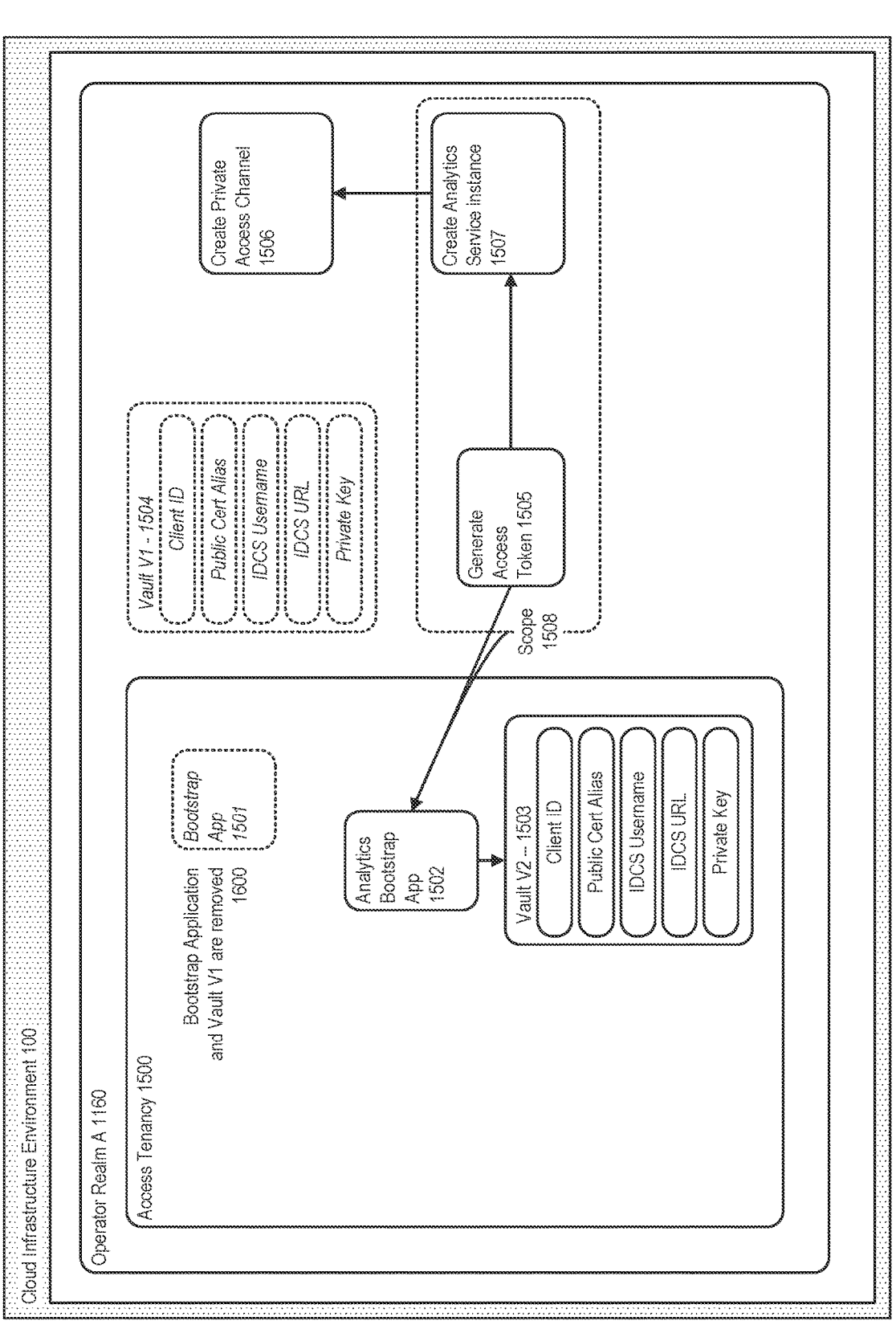
FIG. 16 illustrates an example bootstrapping process within a cloud infrastructure environment, in accordance with an embodiment.

FIG. 16 illustrates an example bootstrapping process within a cloud infrastructure environment, in accordance with an embodiment.

In accordance with an embodiment, the above described instances of the data lake and analytics service have to be deployed within the context of an operator realm. The process of deploying such instances via a bootstrapping method is depicted within FIG. 15.

In accordance with an embodiment, after the instance of the data lake and analytics service has been established within the access tenancy 1500, the bootstrap application (1501) and the vault V1 (1502) can be removed 1600 so that access to the access tenancy 1500 is limited and the data therein remains protected.

FIG. 17 is a flowchart of an exemplary method, in accordance with an embodiment.

In accordance with an embodiment, at step 1710, the method can deploy a central instance of an analytics service in a central cloud realm.

In accordance with an embodiment, at step 1720, the method can deploy a respective instance of the analytics service in each of a plurality of cloud realms.

In accordance with an embodiment, at step 1730, the method can implement a respective different data pipeline for each deployed respective instance of the analytics service, wherein a respective different data pipeline is configured to perform at least one of ingest or transform data for the deployed respective instance of the analytics service, said data being descriptive of use of services associated with a respective cloud realm of the plurality of cloud realms.

In accordance with an embodiment, at step 1740, the method can generate a report by the deployed respective instance of the analytics service based on the data.

In accordance with an embodiment, at step 1750, the method can receive, via cross-realm communications, at least a subset of the data from the respective deployed instance of the analytics service at the central instance of the analytics service.

In accordance with an embodiment, at step 1760, the method can generate a central report by the central instance of the analytics service based on the received at least a subset of data.

In accordance with an embodiment, the above method can be performed on one or more computers comprising one or more microprocessors.

In accordance with an embodiment, the above method can further transform the data by the data pipeline according to dimensions associated with the respective cloud realm and respective instance of the deployed analytics service.

In accordance with an embodiment, each deployed respective instance of the analytics service may not have access to the data of other instances of the analytics service.

In accordance with an embodiment, the at least a subset of data received at the central instance of the analytics service can include at least metering data for service usage calculation, or usage data for capacity planning, or reservation data for capacity planning.

In accordance with an embodiment, the method can further, prior to receiving the at least a subset of the data, filter the at least a subset of the data to remove information that is sensitive with respect to the respective cloud realm of the plurality of cloud realms.

In accordance with an embodiment, a cloud realm of the plurality of cloud realms can comprise one or more data centers.

In accordance with an embodiment, deploying the respective instance of the analytics service in each of the plurality of cloud realms can comprise: deploying, from the central cloud realm, a bootstrap application within each of the plurality of cloud realms, pulling, via the bootstrap application deployed within each of the plurality of cloud realms, identifying data associated with each respective plurality of cloud realms to a temporary storage associated with the central cloud realm, and, upon deploying the respective instance of the analytics service in each of the plurality of cloud realms, deleting the temporary storage associated with the central cloud realm.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings.

Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A method, comprising:

deploying a central analytics service instance in a central cloud realm;

deploying a plurality of cloud realm-specific analytics service instances respectively in each of a plurality of cloud realms, each of the plurality of cloud realm-specific analytics service instances independently executing within a respective cloud realm of the plurality of cloud realms;

implementing a plurality of data pipelines respectively in the plurality of cloud realm-specific analytics service instances, wherein a first data pipeline, of the plurality of data pipelines, is (a) configured in accordance with a first set of dimensions associated with a first cloud realm-specific analytics service instance of the plurality of cloud realm-specific analytics service instances and (b) configured to perform at least one of ingesting or transforming a first set of usage data corresponding to the first cloud realm-specific analytics service instance and associated with a first cloud realm of the plurality of cloud realms;

wherein a second data pipeline, of the plurality of data pipelines, is (a) configured in accordance with a second set of dimensions associated with a second cloud realm- specific analytics service instance of the plurality of cloud realm-specific analytics service instances and (b) configured to perform at least one of ingesting or transforming a second set of usage data corresponding to the second cloud realm-specific analytics service instance and associated with a second cloud realm of the plurality of cloud realms;

wherein the first cloud realm-specific analytics service instance is different from and operates independently from the second cloud realm-specific analytics service instance;

wherein the first data pipeline is different from and operates independently from the second data pipeline;

generating a first realm-specific report by the first cloud realm-specific analytics service instance based on the first set of usage data;

generating a second realm-specific report by the second cloud realm-specific analytics service instance based on the second set of usage data;

receiving, at the central analytics service instance via cross-realm communications using the first data pipeline, at least a subset of the first set of usage data;

receiving, at the central analytics service instance via cross-realm communications using the second data pipeline, at least a subset of the second set of usage data; and generating a central report by the central analytics service instance based at least on the subset of first set of usage data and the subset of the second set of usage data;

wherein the method is performed on one or more computers comprising one or more microprocessors.

2. The method of claim 1, further comprising:

transforming the first set of usage data by the first data pipeline according to first set of dimensions associated with the first cloud realm and the first cloud realm-specific analytics service instance; and transforming the second set of usage data by the second data pipeline according to a second set of dimensions associated with the second cloud realm and the second cloud realm-specific analytics service instance.

3. The method of claim 1, wherein the first cloud realm-specific analytics service instance does not have access to the second set of usage data, and wherein the second cloud realm-specific analytics service instance does not have access to the first set of usage data.

4. The method of claim 1, wherein the at least a subset of the first set of usage data and the at least a subset of the second set of usage data received at the central analytics service instance includes at least metering data for service usage calculation, or usage data for capacity planning, or reservation data for capacity planning.

5. The method of claim 1, further comprising:

prior to receiving the at least a subset of the first set of usage data, filtering the at least a subset of the first set of usage data to remove information that is sensitive with respect to the first cloud realm; and prior to receiving the at least a subset of the second set of usage data, filtering the at least a subset of the second set of usage data to remove information that is sensitive with respect to the second cloud realm.

6. The method of claim 1, wherein the first cloud realm comprises one or more data centers.

7. The method of claim 1, wherein deploying the first analytics service instance comprises:

deploying, from the central cloud realm, a bootstrap application within the first cloud realm;

pulling, via the bootstrap application deployed within the first cloud realm, identifying data associated with the first cloud realm to a temporary storage associated with the central cloud realm; and upon deploying the first analytics service instance, deleting the temporary storage associated with the central cloud realm.

8. A system, comprising:

one or more computers, each comprising one or more microprocessors, wherein the one or more computers are configured to perform a method comprising:

deploying a central analytics service instance in a central cloud realm;

deploying a plurality of cloud realm-specific analytics service instances respectively in each of a plurality of cloud realms, each of the plurality of cloud realm-specific analytics service instances independently executing within a respective cloud realm of the plurality of cloud realms;

implementing a plurality of data pipelines respectively in the plurality of cloud realm-specific analytics service instances, wherein a first data pipeline, of the plurality of data pipelines, is (a) configured in accordance with a first set of dimensions associated with a first cloud realm-specific analytics service instance of the plurality of cloud realm-specific analytics service instances and (b) configured to perform at least one of ingesting or transforming a first set of usage data corresponding to the first cloud realm-specific analytics service instance and associated with a first cloud realm of the plurality of cloud realms;

wherein a second data pipeline, of the plurality of data pipelines, is (a) configured in accordance with a second set of dimensions associated with a second cloud realm-specific analytics service instance of the plurality of cloud realm-specific analytics service instances and (b) configured to perform at least one of ingesting or transforming a second set of usage data corresponding to the second cloud realm-specific analytics service instance and associated with a second cloud realm of the plurality of cloud realms;

wherein the first cloud realm-specific analytics service instance is different from and operates independently from the second cloud realm-specific analytics service instance;

wherein the first data pipeline is different from and operates independently from the second data pipeline;

generating a first realm-specific report by the first cloud realm- specific analytics service instance based on the first set of usage data;

generating a second realm-specific report by the second cloud realm-specific analytics service instance based on the second set of usage data;

receiving, at the central analytics service instance via cross-realm communications using the first data pipeline, at least a subset of the first set of usage data;

receiving, at the central analytics service instance via cross-realm communications using the second data pipeline, at least a subset of the second set of usage data; and generating a central report by the central analytics service instance based at least on the subset of first set of usage data and the subset of the second set of usage data.

9. The system of claim 8, wherein the method further comprises:

transforming the first set of usage data by the first data pipeline according to first set of dimensions associated with the first cloud realm and the first cloud realm-specific analytics service instance; and transforming the second set of usage data by the second data pipeline according to a second set of dimensions associated with the second cloud realm and the second cloud realm-specific analytics service instance.

10. The system of claim 8, wherein the first cloud realm-specific analytics service instance does not have access to the second set of usage data, and wherein the second cloud realm-specific analytics service instance does not have access to the first set of usage data.

11. The system of claim 8, wherein the at least a subset of the first set of usage data and the at least a subset of the second set of usage data received at the central analytics service instance includes at least metering data for service usage calculation, or usage data for capacity planning, or reservation data for capacity planning.

12. The system of claim 8, wherein the method further comprises:

prior to receiving the at least a subset of the first set of usage data, filtering the at least a subset of the first set of usage data to remove information that is sensitive with respect to the first cloud realm; and prior to receiving the at least a subset of the second set of usage data, filtering the at least a subset of the second set of usage data to remove information that is sensitive with respect to the second cloud realm.

13. The system of claim 8, wherein the first cloud realm comprises one or more data centers.

14. The system of claim 8, wherein deploying the first analytics service instance comprises:

deploying, from the central cloud realm, a bootstrap application within the first cloud realm;

pulling, via the bootstrap application deployed within the first cloud realm, identifying data associated with the first cloud realm to a temporary storage associated with the central cloud realm; and upon deploying the first analytics service instance, deleting the temporary storage associated with the central cloud realm.

15. A non-transitory computer readable storage medium having instructions thereon, which when read and executed cause a computer comprising one or more microprocessors to perform steps comprising:

deploying a central analytics service instance in a central cloud realm;

deploying a plurality of cloud realm-specific analytics service instances respectively in each of a plurality of cloud realms, each of the plurality of cloud realm-specific analytics service instances independently executing within a respective cloud realm of the plurality of cloud realms;

implementing a plurality of data pipelines respectively in the plurality of cloud realm-specific analytics service instances, wherein a first data pipeline, of the plurality of data pipelines, is (a) configured in accordance with a first set of dimensions associated with a first cloud realm-specific analytics service instance of the plurality of cloud realm-specific analytics service instances and (b) configured to perform at least one of ingesting or transforming a first set of usage data corresponding to the first cloud realm-specific analytics service instance of the analytics service, said data being descriptive of use of services and associated with a respective a first cloud realm of the plurality of cloud realms;

wherein a second data pipeline, of the plurality of data pipelines, is (a) configured in accordance with a second set of dimensions associated with a second cloud realm-specific analytics service instance of the plurality of cloud realm-specific analytics service instances and (b) configured to perform at least one of ingesting or transforming a second set of usage data corresponding to the second cloud realm-specific analytics service instance and associated with a second cloud realm of the plurality of cloud realms;

wherein the first cloud realm-specific analytics service instance is different from and operates independently from the second cloud realm-specific analytics service instance;

wherein the first data pipeline is different from and operates independently from the second data pipeline;

generating a first realm-specific report by the deployed respective first cloud realm-specific analytics service instance of the analytics service based on the first set of usage data;

generating a second realm-specific report by the second cloud realm-specific analytics service instance based on the second set of usage data;

receiving, at the central analytics service instance via cross-realm communications using the first data pipeline, at least a subset of the first set of usage data;

receiving, at the central analytics service instance via cross-realm communications using the second data pipeline, at least a subset of the second set of usage data; and generating a central report by the central analytics service instance based at least on the subset of first set of usage data and the subset of the second set of usage data.

16. The non-transitory computer readable storage medium of claim 15, the steps further comprising:

transforming the first set of usage data by the first data pipeline according to first set of dimensions associated with the first cloud realm and the first cloud realm-specific analytics service instance; and transforming the second set of usage data by the second data pipeline according to a second set of dimensions associated with the second cloud realm and the second cloud realm-specific analytics service instance.

17. The non-transitory computer readable storage medium of claim 15, wherein the first cloud realm-specific analytics service instance does not have access to the second set of usage data, and wherein the second cloud realm-specific analytics service instance does not have access to the first set of usage data.

18. The non-transitory computer readable storage medium of claim 15, wherein the at least a subset of the first set of usage data and the at least a subset of the second set of usage data received at the central analytics service instance includes at least metering data for service usage calculation, or usage data for capacity planning, or reservation data for capacity planning.

19. The non-transitory computer readable storage medium of claim 15, the steps further comprising:

prior to receiving the at least a subset of the first set of usage data, filtering the at least a subset of the first set of usage data to remove information that is sensitive with respect to the first cloud realm; and prior to receiving the at least a subset of the second set of usage data, filtering the at least a subset of the second set of usage data to remove information that is sensitive with respect to the second cloud realm.

20. The non-transitory computer readable storage medium of claim 15, wherein the first cloud realm comprises one or more data centers.

21. The non-transitory computer readable storage medium of claim 15, wherein deploying the first analytics service instance comprises:

deploying, from the central cloud realm, a bootstrap application within the first cloud realm;

pulling, via the bootstrap application deployed within the first cloud realm, identifying data associated with the first cloud realm to a temporary storage associated with the central cloud realm; and upon deploying the first analytics service instance, deleting the temporary storage associated with the central cloud realm.

* * * * *